United States Patent [19]
Lo et al.

[11] Patent Number: 5,625,435
[45] Date of Patent: Apr. 29, 1997

[54] NON-SCANNING 3D PHOTOGRAPHIC PRINTER WITH A PARTITIONED APERTURE

[75] Inventors: Allen K. W. Lo, Dunwoody; Kenneth Q. Lao, Atlanta, both of Ga.

[73] Assignee: Image Technology International, Inc., Norcross, Ga.

[21] Appl. No.: 349,481

[22] Filed: Dec. 2, 1994

Related U.S. Application Data

[63] Continuation-in-part of Ser. No. 140,681, Oct. 21, 1993, abandoned.

[51] Int. Cl.⁶ ............................................. G03B 35/14
[52] U.S. Cl. ......................................... 355/22; 396/324
[58] Field of Search ................... 355/22; 354/112, 354/113, 115, 76; 396/324, 325, 327, 429

[56] References Cited

U.S. PATENT DOCUMENTS

| | | |
|---|---|---|
| 3,240,138 | 3/1966 | Goddard . |
| 3,674,339 | 7/1972 | Sayanagi ............................ 350/130 |
| 3,895,867 | 7/1975 | Lo et al. .............................. 355/77 |
| 3,960,563 | 6/1976 | Lo et al. .............................. 96/40 |
| 4,059,354 | 11/1977 | Lo et al. ............................ 355/22 |
| 4,101,210 | 7/1978 | Lo et al. .............................. 355/7 |
| 4,107,712 | 8/1978 | Law . |
| 4,120,562 | 10/1978 | Lo et al. ............................ 350/130 |
| 4,125,849 | 11/1978 | Law . |
| 4,132,468 | 1/1979 | Lo et al. .............................. 353/7 |
| 4,166,684 | 9/1979 | Law . |
| 4,468,115 | 8/1984 | Lao . |
| 4,852,972 | 8/1989 | Lo .................................... 350/131 |
| 4,903,069 | 2/1990 | Lam .................................. 355/22 |
| 5,028,950 | 7/1991 | Fritsch ............................... 355/22 |
| 5,111,236 | 5/1992 | Lo ..................................... 355/22 |
| 5,160,962 | 11/1992 | Miura et al. . |
| 5,192,969 | 3/1993 | Igarashi et al. . |
| 5,302,988 | 4/1994 | Nanjo ................................ 354/62 |
| 5,349,403 | 9/1994 | Lo .................................... 354/114 |
| 5,349,419 | 9/1994 | Taguchi et al. ..................... 355/22 |
| 5,408,294 | 4/1995 | Lam .................................. 355/22 |
| 5,448,322 | 9/1995 | Bacs, Jr. .......................... 354/112 |

OTHER PUBLICATIONS

T. Okoshi "Three Dimensional Imaging Technique" 1976, pp. 16–17.

Primary Examiner—Arthur T. Grimley
Assistant Examiner—David A. Lane
Attorney, Agent, or Firm—Deveau, Colton & Marquis

[57] ABSTRACT

A 3D photographic printer and printing method wherein a stationary projection lens is used to project a series of 2D views each at a different projection angle onto a stationary lenticular print material. The aperture of the projection lens is sufficient large to cover the entire width of each of the lenticules on the print material. The lens aperture is mechanically or optically partitioned into a number of sections so that only one section is opened to allow a 2D view to be exposed at a different projection angle.

24 Claims, 22 Drawing Sheets

NON-SCANNING 3D PHOTOGRAPHIC PRINTER WITH A PARTITIONED APERTURE

This is a continuation-in-part of application Ser. No. 08/140,681 filed on Oct. 21, 1993, now abandoned.

BACKGROUND OF THE INVENTION

1. Field of Invention

The present invention relates, in general, to a photographic printing method and a printer for producing three-dimensional (3D) pictures on lenticular print material.

2. Prior Art

In lenticular 3D photography, the basic process involves taking a plurality of two-dimensional (2D) images of a scene from a number of horizontally-spaced vantage points, and exposing the 2D images on lenticular print material through one or more projection lenses at different projection angles. It is well-known that lenticular print material is made of a lenticular screen coated with or attached to a photosensitive emulsion, and a lenticular screen is a transparent sheet embossed with an array of contiguous semi-cylindrical lenses, or lenticules. When an array of 2D images are exposed through the lenticular screen, these 2D images are optically compressed to become line-form images. It should be kept in mind that a 3D picture is composed of 2D images of slightly different views of a scene, therefore, these 2D images must be accurately aligned with each other in reference to a point in the scene. This reference point is known as the "key subject" in 3D photography and the alignment process is usually referred to as "key subject alignment".

U.S. Pat. No. 5,028,950 (Fritsch) discloses a dual-stage 3D printer in which a single projection lens is used to expose at different projection angles a set of 2D images of a scene recorded on film. U.S Pat. No. 4,903,069 (Lam) also discloses a 3D printer which uses a single lens to expose a set of 2D images recorded on film onto lenticular print material. In these disclosed methods, in order that the photosensitive emulsion underlying the lenticules be filled with compressed line-form images, a scanning mechanism is required to move the projection lens, the print material, relative to the negative images, to different positions to change the projection angles. This requirement demands a mechanical design with high levels of sophistication. Moreover, in both disclosed methods, a very complex scheme must be used to perform key subject alignment.

U.S. Pat. No. 4,111,236 (Lo) discloses a method for simultaneously printing three 3D pictures through a common projection lens. With this disclosed method, each piece of print material must be exposed three times at three different projection angles from the same set of 2D images recorded on film. This method does not require moving the projection lens relative to the 2D images, but the print material must still be moved to different locations to change the projection angles. Furthermore, with the Lo's method, the three 2D images recorded on film must be physically separated so that the key subject in each image can be properly aligned prior to printing. Because this procedure is very tedious and time-consuming, it is useful only for printing multiple copies of 3D pictures in large quantities. This method is impractical for printing consumer 3D pictures in single copies or in small number of copies.

In all the above-mentioned methods, only a relatively small number of 2D images can be used to compose a 3D picture. Such a 3D picture usually appears "jumpy", especially in the far background or near foreground areas.

U.S. Pat. Nos. 4,166,684 (Law), 4,125,849 (Law) and 4,107,712 (Law) disclose a camera for taking a 3D picture from a real scene wherein the aperture of the camera is movable transversely across the taking lens to change the vantage points, and the lenticular screen is moved in relative to the photographic emulsion. With this method, the lenticular screen and the photosensitive emulsion must be separable. Thus, the method disclosed by Law cannot use lenticular print material precoated with photosensitive emulsion. Moreover, after chemical processing, the photosensitive emulsion must be laminated to a viewing screen to become a 3D picture.

It is advantageous to provide a printer of simple design, wherein the movement of projection lens and the print material in relation to the 2D images is not required. Moreover, it is desirable to provide a printer capable of making 3D pictures of high quality on precoated print material.

SUMMARY OF THE INVENTION

In order to simplify the description of the present invention, the printer is described in reference to X, Y and Z coordinates where the Y axis is the vertical axis and XZ plane is a horizontal plane. For illustrative purposes only, the printer is oriented such that the image plane of the projection lens, and therefore the print material, are parallel to the XY plane; the longitudinal axes of the lenticules on lenticular print material are oriented in the vertical direction, or parallel to the Y axis. It is understood, however, that in practice the printer may be oriented in any proper way.

Briefly described, the 3D photographic printer, according to the present invention, uses a single, large-aperture projection lens to cover all of the projection angles necessary for filling the photosensitive surface underlying each lenticule with compressed line-form images. The aperture that is necessary tier filling the entire area underlying each lenticule will be hereafter referred to as the "full aperture".

By using a projection lens with a full aperture for exposure, the projection lens itself and the print material can be kept stationary during the entire printing process. In order to expose a plurality of 2D images of different views of a scene onto a print material at different projection angles through a stationary projection lens, the full aperture of the projection lens is partitioned into a plurality of horizontally-spaced sections, corresponding to the number of views. The number of the partitioned sections can be as small as 2 and as large as 200 or more. For example, if a set of four 2D images of different views is used to compose a 3D picture, then the lens aperture is partitioned into four horizontally-spaced sections. During printing, only one section is opened to project a different 2D image onto the print material at a different projection angle. When an aperture section is opened to expose a 2D image, the compressed line-form image formed on the photosensitive emulsion underlying each lenticule is approximately equal to ¼ of the width of the lenticules. Accordingly, when all four 2D images are exposed through four different aperture sections, the compressed line-form images substantially fill the entire area of the photosensitive emulsion underlying each lenticule.

It should be kept in mind that the term "horizontally-spaced sections" adopted herein means that the sections are spaced in a direction perpendicular to the longitudinal axes of the lenticules.

In the preferred embodiment of the printer, according to the present invention, 2D images of different views are sequentially displayed on the screen of a stationary video monitor, and a large-aperture projection lens is fixedly positioned in front of the monitor screen to expose the displayed 2D images on a stationary lenticular print material during printing. The projection lens is focused on the monitor screen such that the image plane of the projection lens is substantially parallel to the screen. In order that the 2D images exposed on the print material are in proper registration with each other, 2D images of different views of a scene are captured by one or more electronic cameras arranged such that these cameras are aimed at a common point, or the key subject, of the photographed scene while capturing images at different viewing angles. The captured 2D images can be directly displayed on the video monitor screen for printing in real-time, or stored in an electronic medium for later uses. In either case, key subject alignment is not necessary during the making of a 3D picture. This method can also be used to make 3D pictures from other images such as computer-generated images and medical images.

It is an object of the present invention to provide a 3D printing method and a 3D printer which do not require the moving of the projection lens and the print material relative to the 2D images in order to change the projection angles.

It is another object of the present invention to provide a 3D printing method and a 3D printer which are capable of making 3D pictures on lenticular print material precoated with photosensitive emulsion.

It is yet another object of the present invention to provide a 3D printing method and 3D printer which are capable of making 3D pictures in real-time, or making 3D pictures from stored images.

It is a further object of the present invention to provide a 3D printing method and a 3D printer which are capable of making a 3D picture from a different number of views, ranging from 2 to 1000, with little or no changes of mechanical or optical parts.

It is yet another object of the present invention to provide a 3D printing method and a 3D printer which are capable of taking a 3D picture from a real scene or making a 3D picture from a series of 2D images displayed on a video monitor, with little or no changes of mechanical or optical parts.

It is still another object of the present invention to provide a 3D printing method and a 3D printer which are capable of printing 3D pictures without performing key subject alignment when using 2D images directly captured by one or more electronic cameras or 2D images stored in an electronic medium.

It is a further object of the present invention to provide a 3D printing method and a 3D printer which are capable of electronically combining 2D images of different scenes and making 3D pictures from those combined scenes.

These and other related objects, features and advantages of the present invention will become apparent upon reading the following specification in conjunction with the accompanying drawing figures.

DETAILED DESCRIPTION OF THE INVENTION

Figure 1:
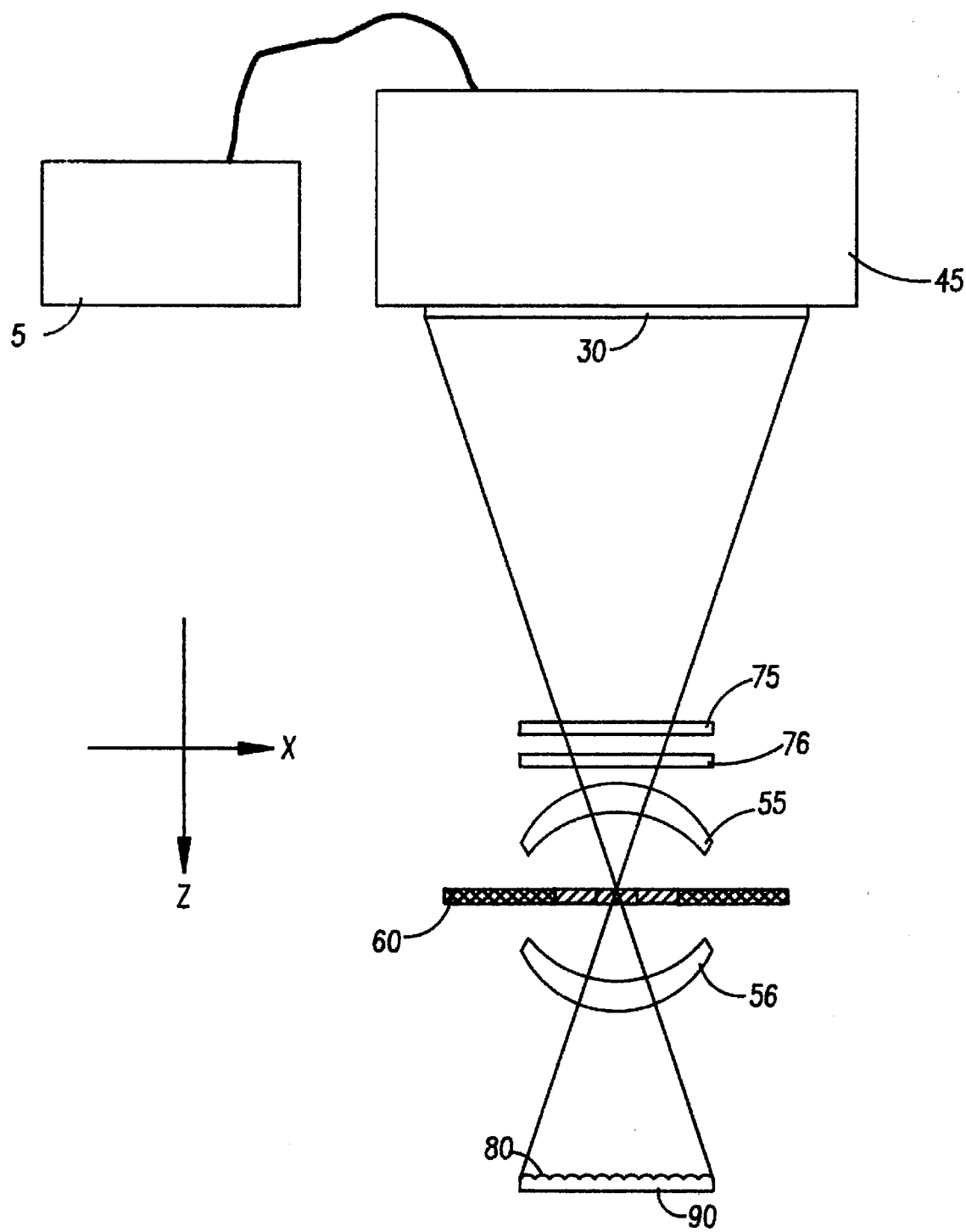
FIG. 1 is a schematic representation of a 3D printer which uses a monitor screen to sequentially display 2D images of different views, and a large-aperture projection lens to expose the displayed 2D images onto lenticular print material.

FIG. 1 is a schematic representation of the preferred embodiment of the 3D printer, according to the present invention, for making a 3D picture on lenticular print material from a plurality of 2D images. These 2D images may represent different 2D views of a scene taken at a number of horizontally-spaced vantage points. In FIG. 1, numeral 5 denotes an image storing device which can be used to receive, store, retrieve and process 2D images. During printing, image storing device 5 is electronically coupled to an image displaying means, for conveying the 2D images. Conveying means other than an electronic coupling can also be used. The image displaying means can be an image projection system, or a video monitor 45 having a screen 30, for sequentially displaying 2D images. As shown, monitor screen 30 is parallel to the XY plane—Y axis is perpendicular to the XZ plane. Numeral 75 denotes a shutter for controlling the exposure time during printing. Numeral 76 denotes a color filter assembly, used for achieving a desired color of the 3D picture. Numeral 55 and 56 denote two parts of a projection lens. Either part of the projection lens may be a multi-element lens or a single-element lens. The entire projection lens may also be an integral assembly. The projection lens is used to expose each 2D image displayed on monitor screen 30 onto print material 80. The projection lens must be properly focused on the screen, and the print material is properly positioned in the image plane of the projection lens. As will be described in detail in conjunction with FIG. 5, the projection lens has a large aperture sufficient to cover the entire width of each lenticule of the print material. Numeral 60 denotes an aperture plate with one or more openings, being disposed between two parts of the projection lens to partition the lens aperture into a number of sections, according to the number of different views to be used. As shown, aperture plate 60 has three openings, suitable for use in composing a 3D picture from three different views. The aperture plate 60 may also be placed behind or in front of the projection lens. Aperture plate 60 can be an opaque plate with a plurality of windows to be selectively opened and closed by mechanical means, or a light valves with a plurality of zones to be selectively activated or deactivated by electro-optic means to control the transmission of light.

During printing, 2D images of different views are displayed on the monitor screen, one view at a time. Synchronously, a different section of the lens aperture is opened to allow each displayed 2D image to be exposed on the print material at a different projection angle. With this arrangement, projection angles are changed by selecting different aperture sections of the projection lens. Thus, the projection lens and the print material remain stationary relative to the monitor screen during the entire printing process.

As shown, print material 80 is a lenticular type material which may comprise a lenticular screen precoated with photosensitive emulsion. Alternatively, print material 80 can be a lenticular screen attached to a separable photosensitive surface but the photosensitive surface remains stationary relative to the lenticular screen during the entire printing process. In FIG. 1, the longitudinal axis of the lenticules is parallel to the Y axis.

It should be noted that, in order to produce a normal and not a reversed image on the print material, the 2D images of different views must be reversed to become mirror images before they are displayed on monitor screen 30. Also, if necessary, the density and color of the 2D images can be modified to suit the characteristics of the photosensitive emulsion and to achieve a desired color of the 3D picture.

Figure 2:
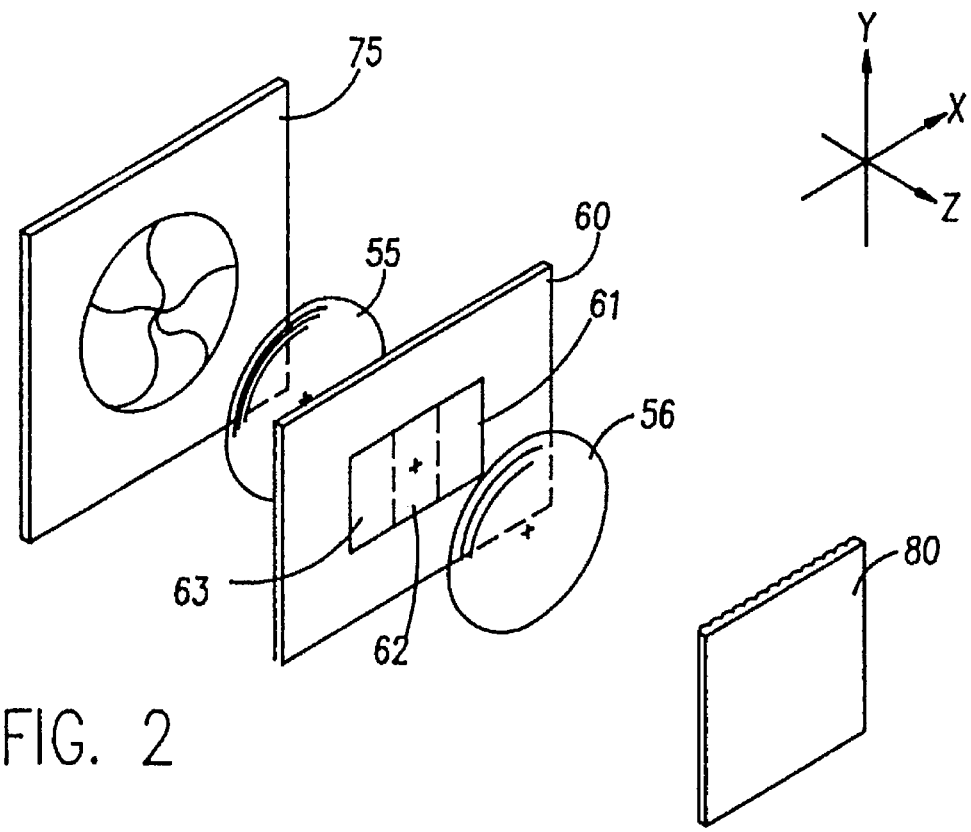
FIG. 2 is a schematic representation of part of the same printer, showing the use of a multiple-window aperture plate to partition the lens aperture into a number of sections.

FIG. 2 is a schematic illustration of part of the printer of FIG. I showing the use of a multiple-window aperture plate to partition the lens aperture into a number of sections. For illustrative purposes, a 3D picture is assumed to be composed of an array of 2D images of three different views, or N=3. It is understood that, however, N can be as small as 2 and as large as 200 or more. As shown in FIG. 2, aperture plate 60 has three horizontally-spaced windows 61, 62 and 63 thereby partitioning the full aperture into three aperture sections. The width of each window is substantially equal to one third of the width of the full aperture. The height of the windows may be adjustable for sharpness and exposure control. During printing, only one window is opened to allow light to be transmitted through a corresponding aperture section so that 2D image of a different view is exposed onto the print material at a different projection angle. If one wishes to make a 3D print from 2D images of five different views instead of three views, one can simply substitute an aperture plate with five windows for the aperture plate with three windows.

It is preferred that, when a 3D is composed to N different views, the width of each window be equal to 1/N of the full aperture. However, the window width can be smaller or greater than 1/N of the full aperture, and the lens aperture can be partitioned into equal sections or unequal sections.

Figure 3:
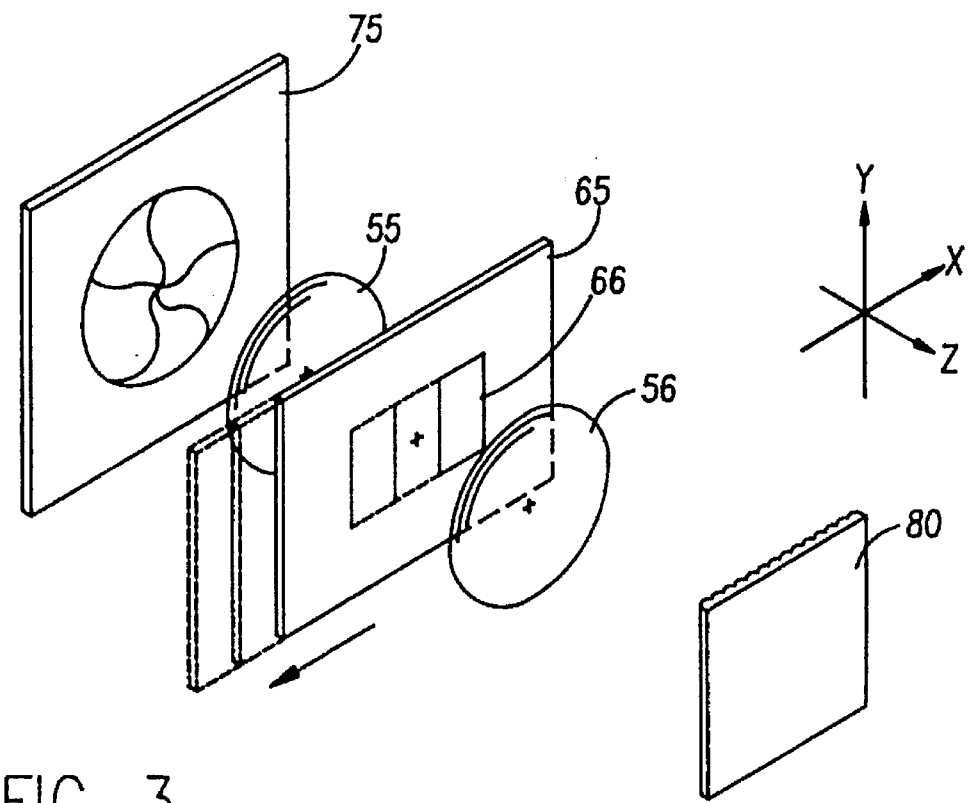
FIG. 3 is a schematic representation of part of the same printer, showing a single-window aperture plate is used to allow a 2D image to be exposed through an aperture section.

FIG. 3 is a schematic illustration of part of the printer of FIG. 1 showing the use a single-window aperture plate to allow 2D images of different views to be exposed through different aperture sections. As shown, aperture plate 65 has a single window 66, the width of which is substantially equal to one third of the full aperture (N=3). In order to expose 2D images of three different views at three different projection angles, single-window aperture plate 65 must be moved to different positions to allow light to transmit through different aperture sections of the projection lens. In effect, window 66 functionally replaces each of the windows 61, 62 and 63 shown in FIG. 2. As with the multiple-window aperture plate, the height of the single window on aperture plate 66 may be adjustable for sharpness and exposure control. It is preferred that, when a 3D picture is composed of N different views, the width of window 66 is substantially equal to 1/N of the full aperture, but the width can be smaller or greater than 1/N of the full aperture.

Figure 4:
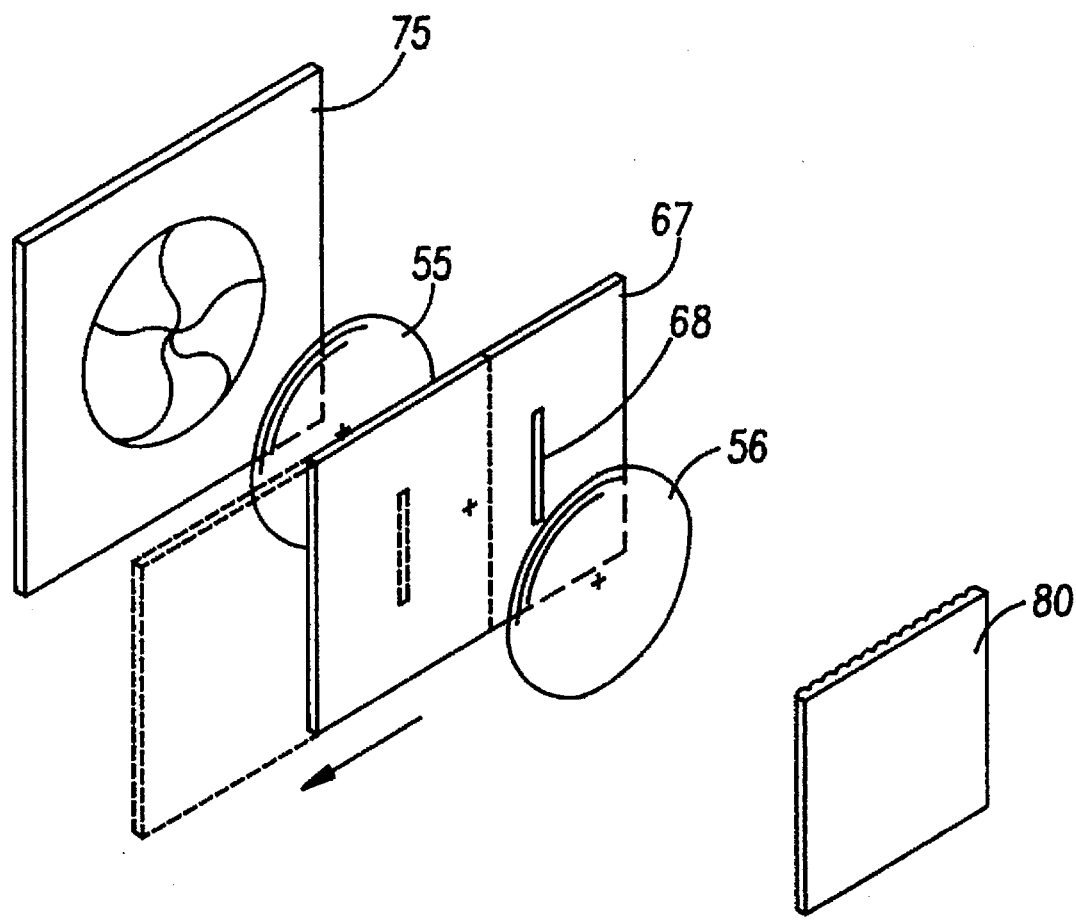
FIG. 4 is a schematic representation of part of the same printer, showing a single-slit aperture plate is used to scan across the aperture to allow a 2D image to be exposed at a different projection angle.
Figure 4:
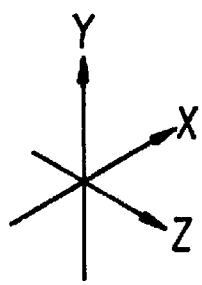

FIG. 4 is a schematic illustration of part of the printer of FIG. 1 showing the use of a single-slit aperture plate to scan across the lens aperture to change the projection angles. As shown, aperture plate 67 has a single narrow slit 68, the width of which is much smaller than one third of the full aperture (N=3). In order to properly fill the photosensitive emulsion underlying each lenticule with compressed lineform images, single slit plate 67 must be laterally shifted, during the exposure of the 2D image of each view, by a distance equal to ⅓ of the full aperture. For exposing the 2D images of all three views to compose a 3D picture, the slit plate 67 must be shifted across the entire full aperture of the projection lens. Usually the slit width is equal or smaller than 1/N of the full aperture. But when N is large, the width of the scanning slit can be greater than 1/N of the full aperture. As with the multiple-window plate 65, the height of the slit 68 may be adjustable for sharpness and exposure control. Also, the scanning speed may be varied for exposure control. With a single-slit aperture plate, one can compose a 3D picture virtually from any number of views, ranging from 2 to 200 or more, without changing any optical and mechanical parts of the printer. Furthermore, one may vary the size of the 3D picture, or the magnification factor, without undertaking major changes of the printer parts. Basically, in order to change the magnification factor, it is only required to adjust the object distance (between the monitor screen and projection lens) and the image distance (between the projection lens and the print material), and the total scanning distance of the single slit. It should be noted that when N is large such that N is 20 or larger, the difference between any two adjacent 2D views is very slight. Consequently, the 3D image on such a 3D picture will appear smooth, and not "jumpy" like the 3D image of a 3D picture made from a small number of 2D views. It is preferred that a 3D picture is made of 50 or more different views so that the quality of the 3D picture is further improved as the image appears much smoother.

Figure 5:
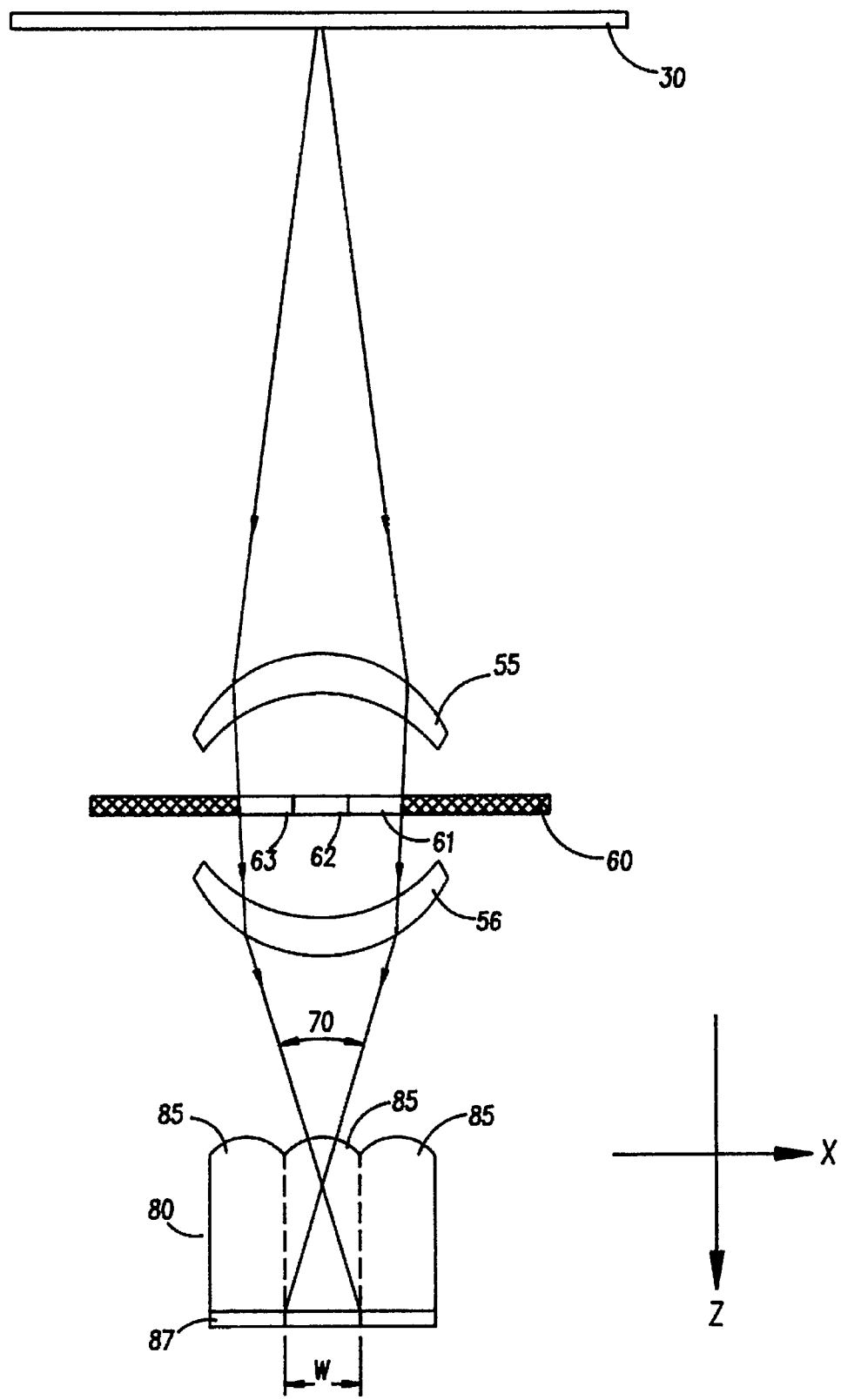
FIG. 5 is a schematic illustration showing the relation between the full aperture of the projection lens and the width of a lenticule when all aperture sections are opened.

FIG. 5 shows the total width of all aperture sections 61, 62 and 63 in relation to the width, w, of a lenticule 85 of print material 80. Numeral 87 denotes the photosensitive emulsion underlying the lenticules. When the print material is located in the image plane of the projection lens, the total projection angle 70 through all aperture sections must properly cover the entire width w of the lenticule. The total projection angle 70 is determined by the total width of windows 61, 62 and 63 and the focusing properties of the projection lens 55, 56. As shown, the aperture plate 60 is partitioned into three sections for exposing an array of 2D images of three different views onto print material 80.

Figure 6:
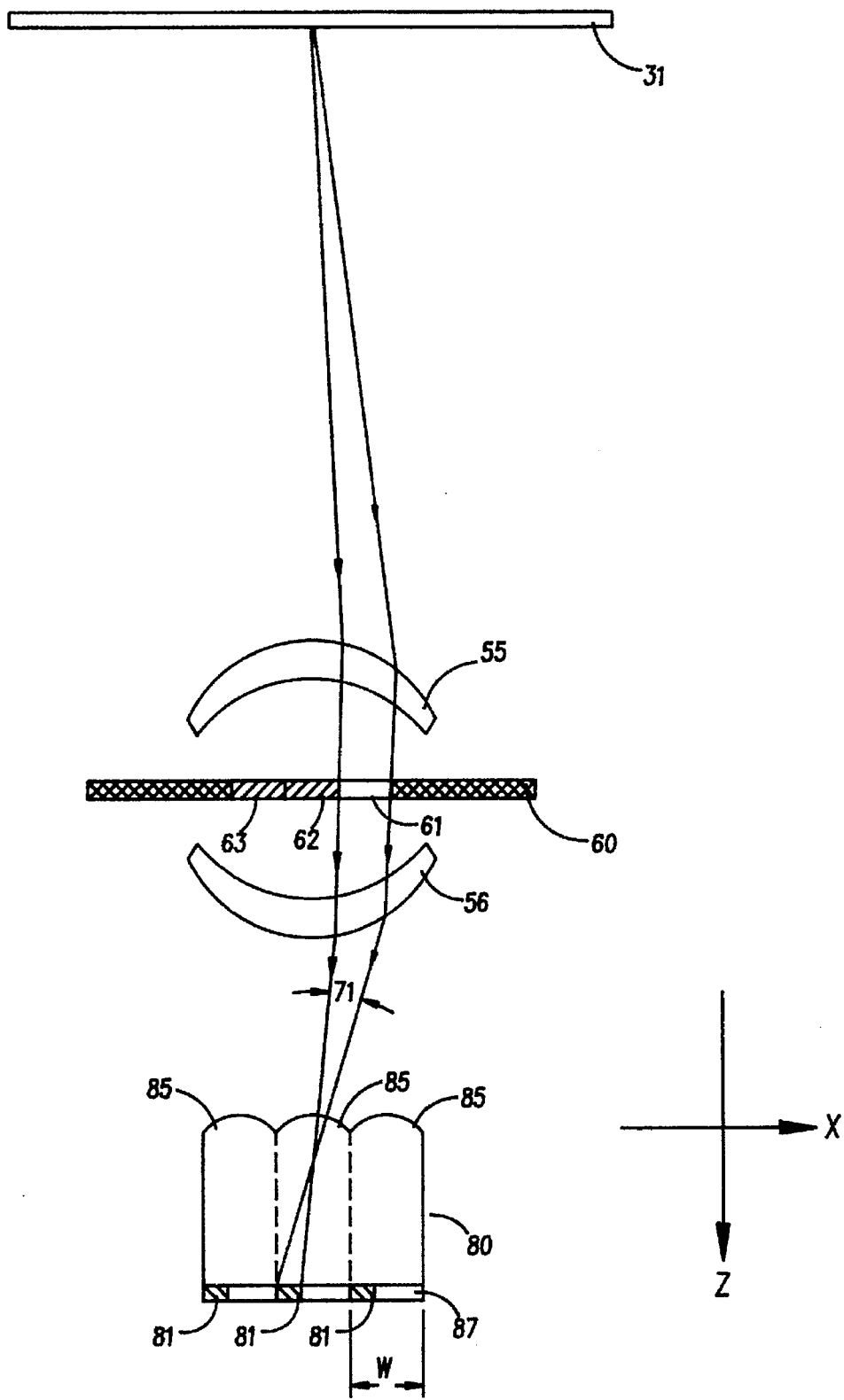
FIG. 6 to FIG. 8 are schematic illustrations showing the relation between the width of each aperture section and the width of the line-form image formed on the photosensitive surface underlying each lenticule.

FIG. 6 shows the compressed line-form images 81 on photosensitive emulsion 87 underlying each lenticule 85 when 2D image 31 of a first view is exposed through projection lens 55, 56 and the opened window 61 of aperture plate 60, onto print material 80. As shown, the projection angle for exposing the 2D image of the first view, denoted by numeral 71, is approximately ⅓ of the total projection angle 70. Accordingly, compressed line-form image 81 is approximately ⅓ of the width of each lenticule 85.

Figure 7:
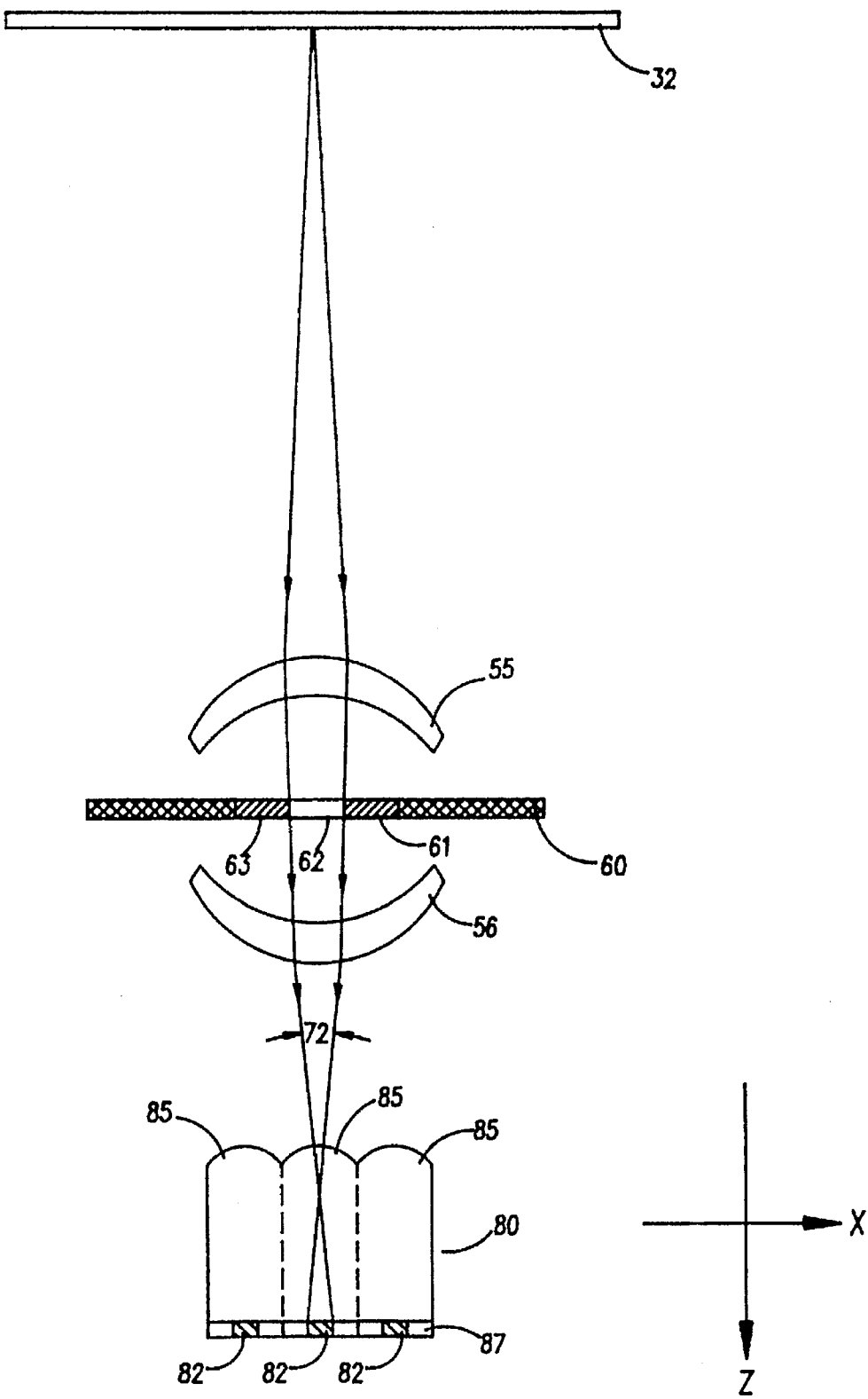

FIG. 7 shows the compressed line-form images 82 on photosensitive emulsion 87 underlying each lenticule 85 when 2D image 32 of a second view is exposed through the projection lens and the opened window 62 of aperture plate 60, onto print material 80. As shown, the projection angle for exposing the 2D image of the second view, denoted by numeral 72, is approximately ⅓ of the total projection angle 70. Accordingly, compressed line-form image 82 is approximately ⅓ of the width of each lenticule 85.

Figure 8:
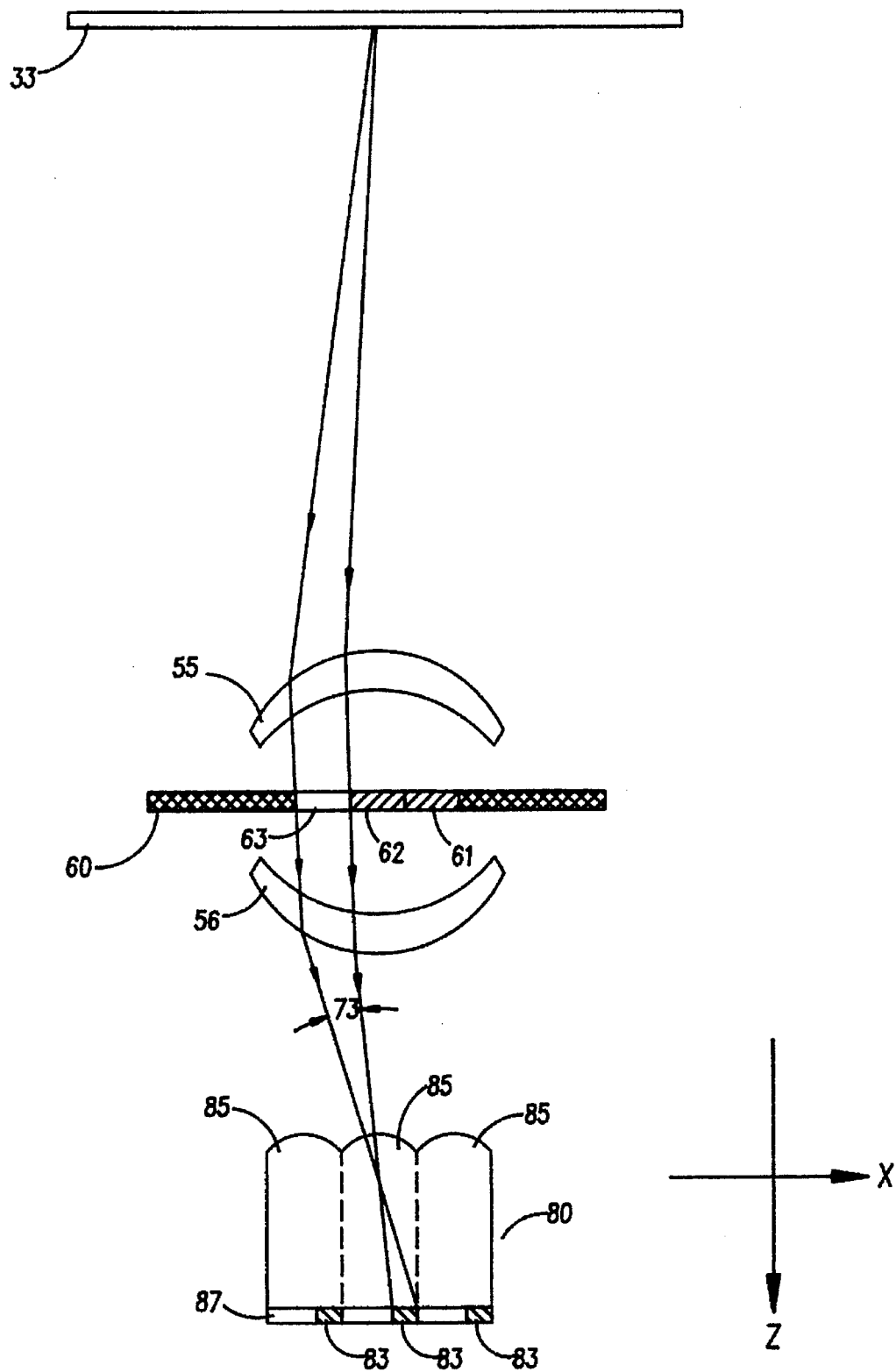

FIG. 8 shows the compressed line-form images 83 on photosensitive emulsion 87 underlying each lenticule 85 when 2D image 33 of a third view is exposed through the projection lens and the opened window 63 of the aperture plate 60, onto print material 80. As shown, the projection angle for exposing the 2D image of the third view, denoted by numeral 73, is approximately ⅓ of the total projection angle 70. Accordingly, compressed line-form image 83 is approximately ⅓ of the width of each lenticule 85. In FIG. 6 to FIG. 8, the lenticules are enlarged many times to show how the photosensitive emulsion is properly filled with compressed line-form images. It should be noted that, 2D images 31, 32 and 33 must be arranged in a proper order so that the compressed line-form images 81, 82 and 83 yield the correct left and right parallax in order to produce a normal, and not a pseudoscopic, 3D image.

Figure 9:
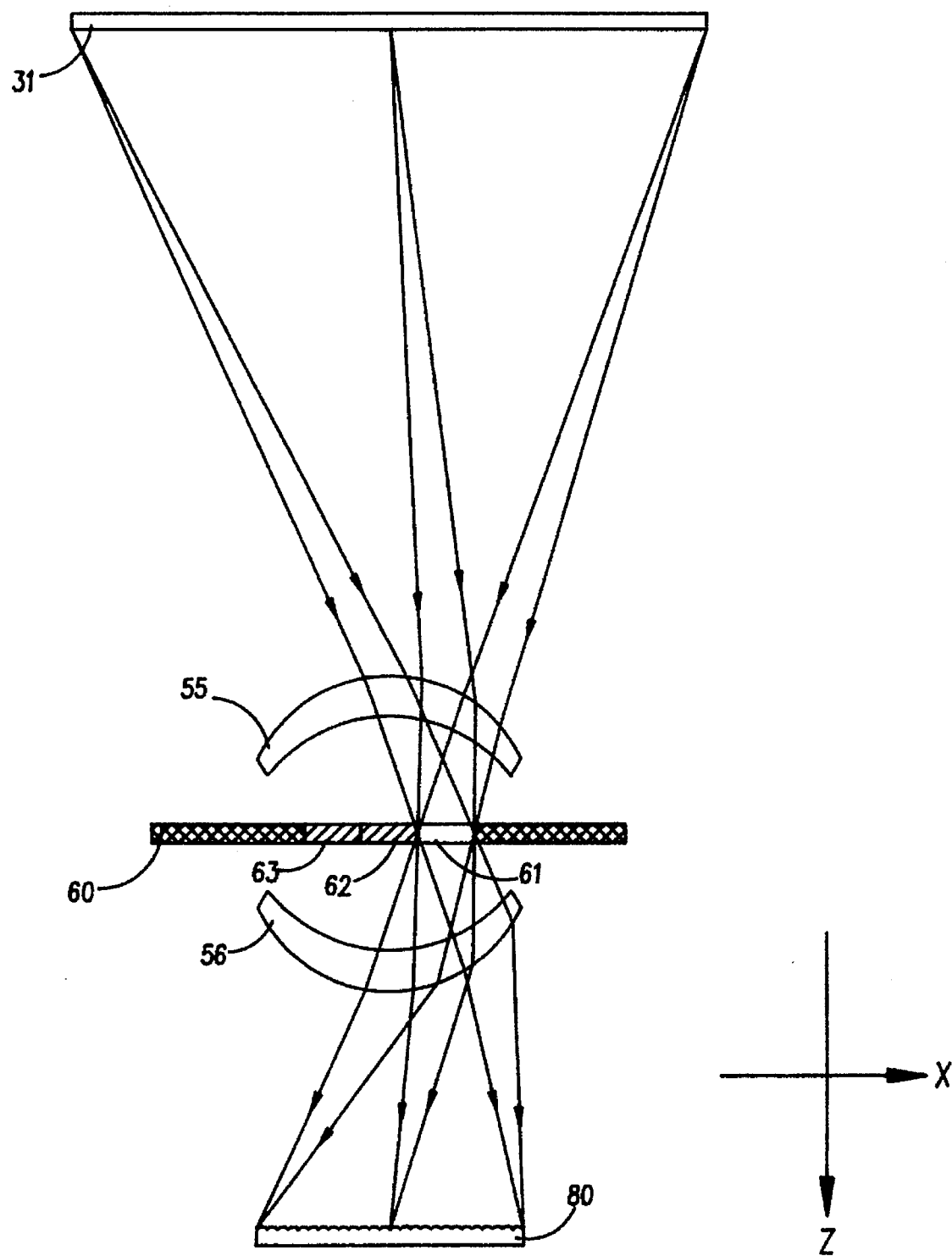
FIG. 9 to FIG. 11 are schematic illustrations showing an array of different 2D images being exposed through different aperture sections of the projection lens onto lenticular print material at different projection angles.
Figure 10:
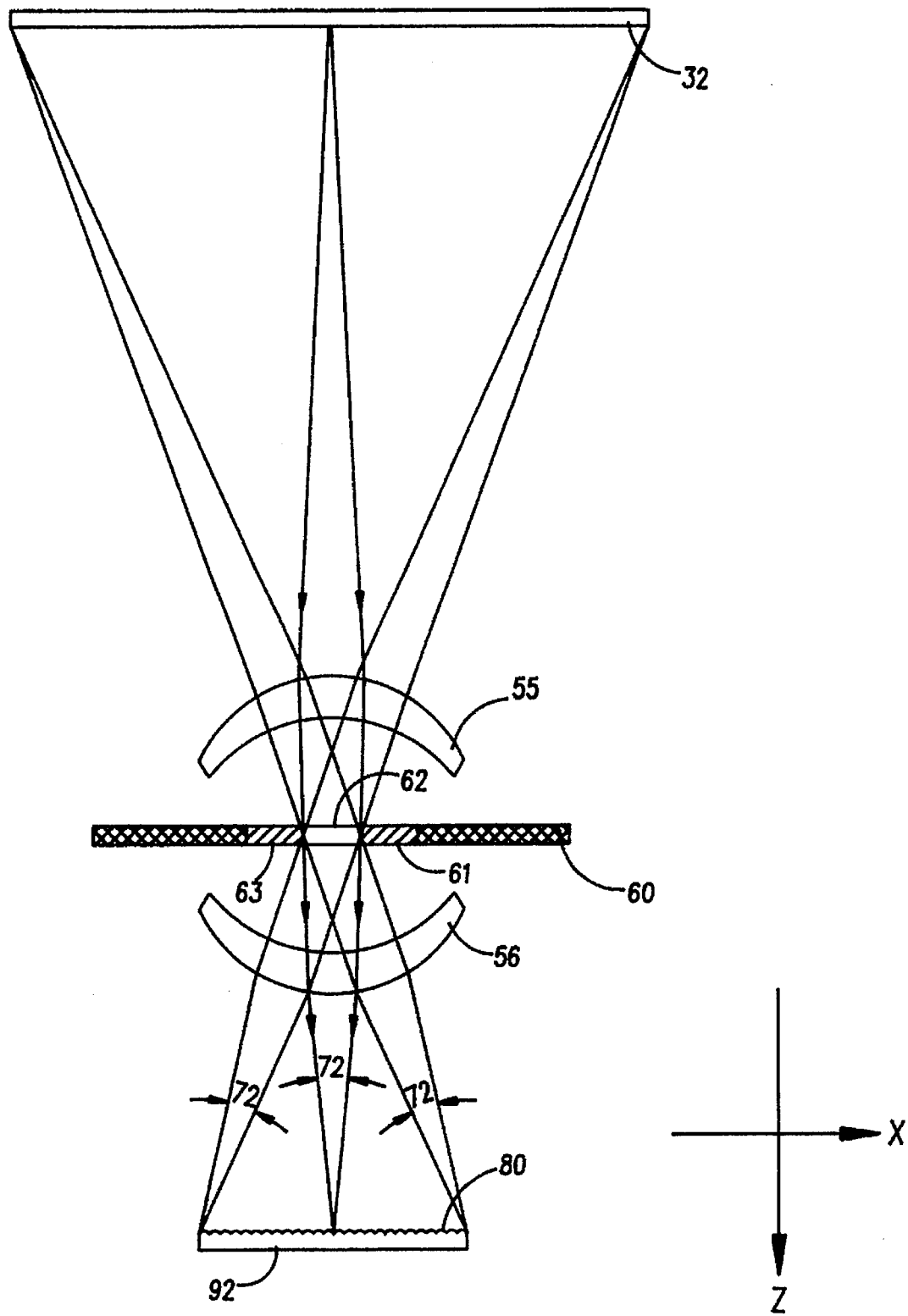
Figure 11:
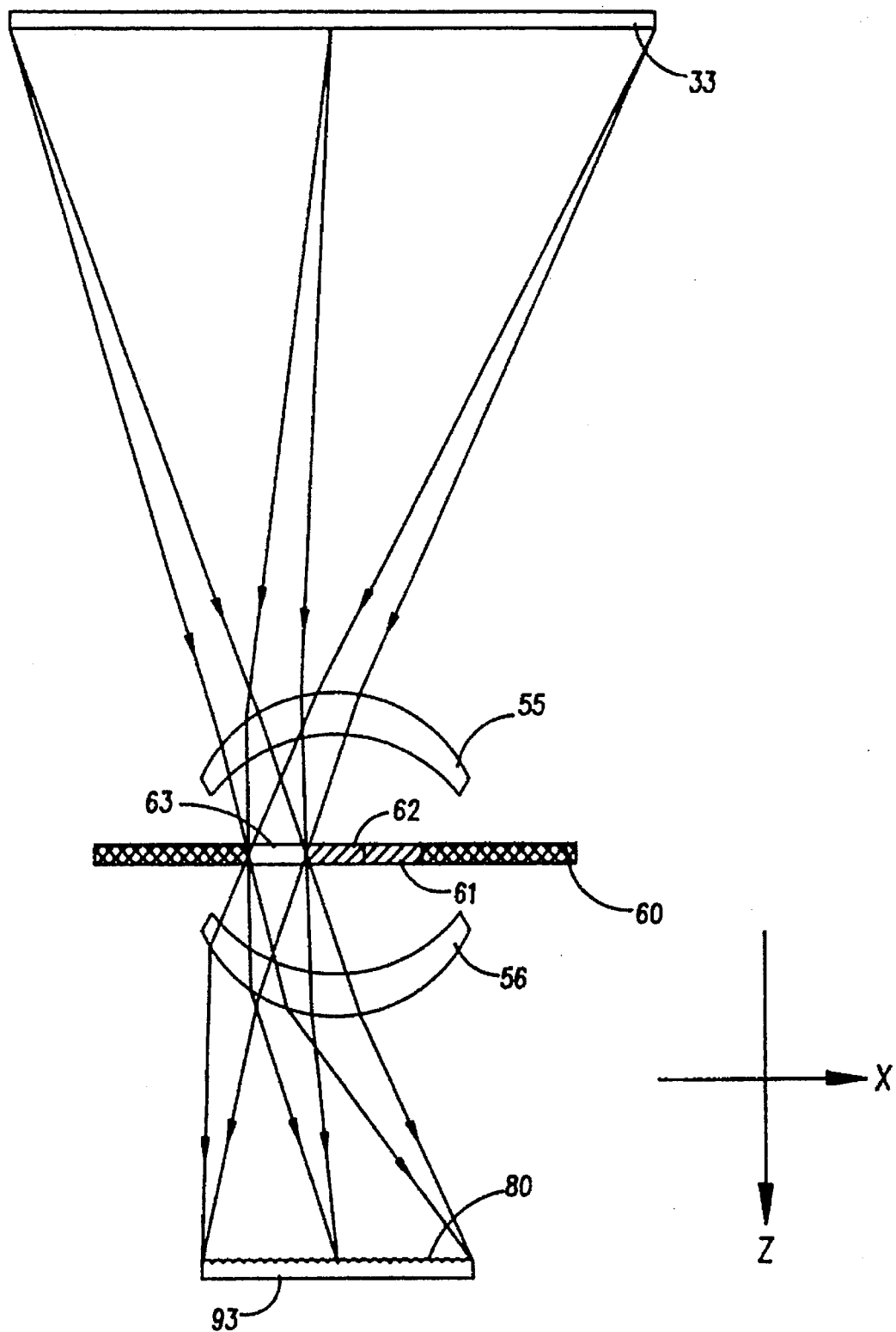

FIG. 9 to FIG. 11 show the projection angles in relation to the entire 3D print. FIG. 9 shows the projection angles for exposing 2D image 31 of the first view through the projection lens and the opened window 61 of the aperture plate.

FIG. 10 shows the projection angles for exposing 2D image 32 of the second view through the projection lens and the opened window 62 of the aperture plate. FIG. 11 shows the projection angles for exposing 2D image 33 of the third view through the projection lens and the opened window 63 of the aperture plate.

Figure 12:
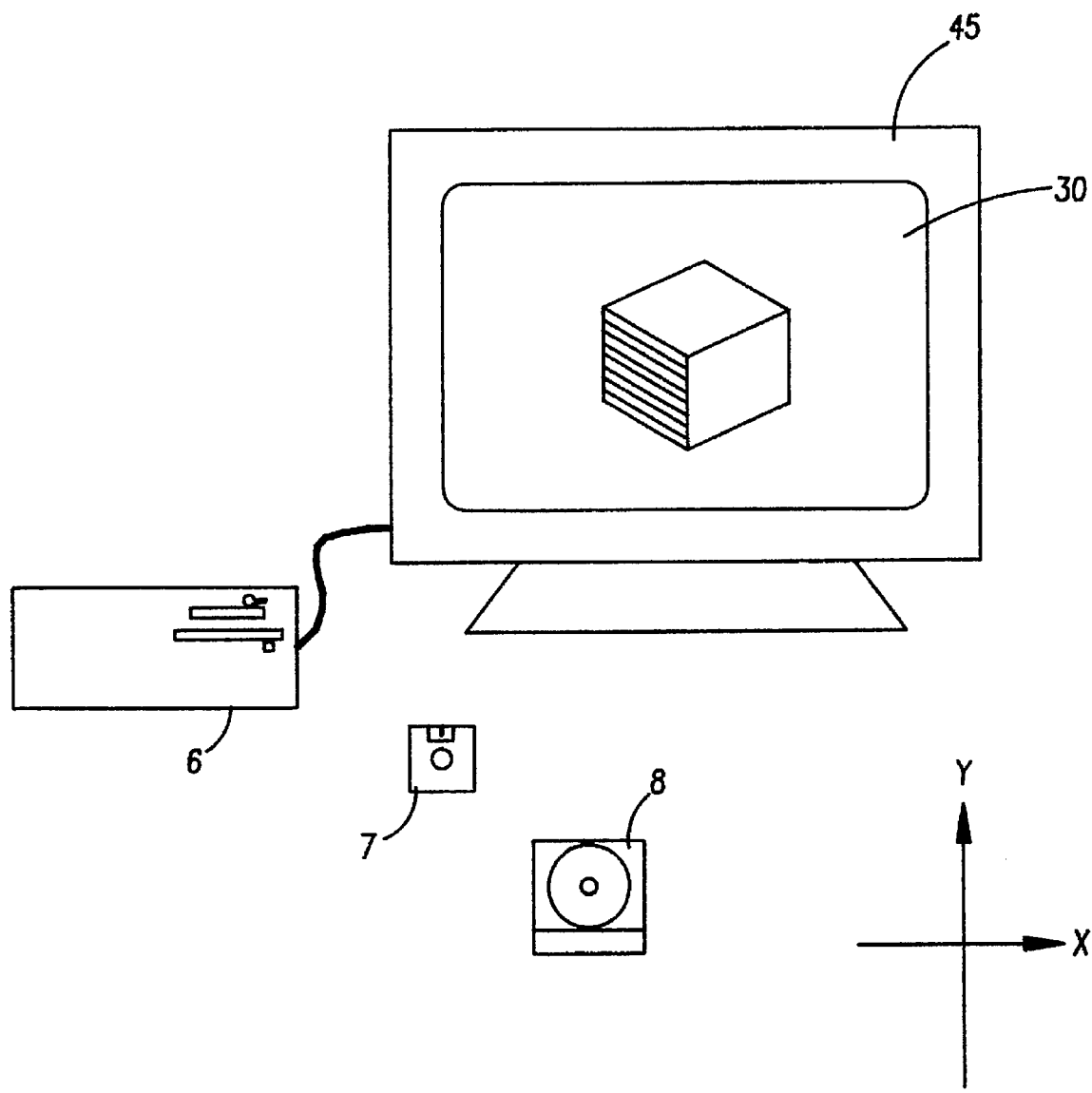
FIG. 12 is a schematic illustration showing an electronic medium being used for storing 2D images and conveying 2D images to a video monitor for display.

FIG. 12 shows that 2D images used for composing 3D pictures can be stored in an electronic medium such as a hard-disk in a computer 6, a diskette 7, a CD-ROM 8. They can also be stored in a magnetic card, magnetic tape or a photo-CD. These 2D images can be retrieved, reversed or/and modified before they are sequentially displayed on the monitor screen 30 of a video monitor 45. The longer dimension of video monitor screen can be oriented in a vertical direction or a horizontal direction. While the monitor screen is kept substantially parallel to the XY plane, the monitor may be tilted or rotated by a certain angle about the z axis to reduce possible Moire effect on the 3D picture.

The 2D images used to compose a 3D picture can be photographed images, computer generated images or artist's renditions. They can also be medical images in NMR, ultrasound, conventional x-ray, x-ray tomography, etc. These images can be electronically cut and pasted and combined in many different ways. Furthermore, a set of 2D images for making a 3D picture can be different views of a scene, or views of different scenes. A set of 2D images can be different views of a static scene, or different views of an animated object. 2D images of a scene can also be directly or indirectly captured by one or more electronic cameras, as shown in FIG. 13 to FIG. 17.

Figure 13:
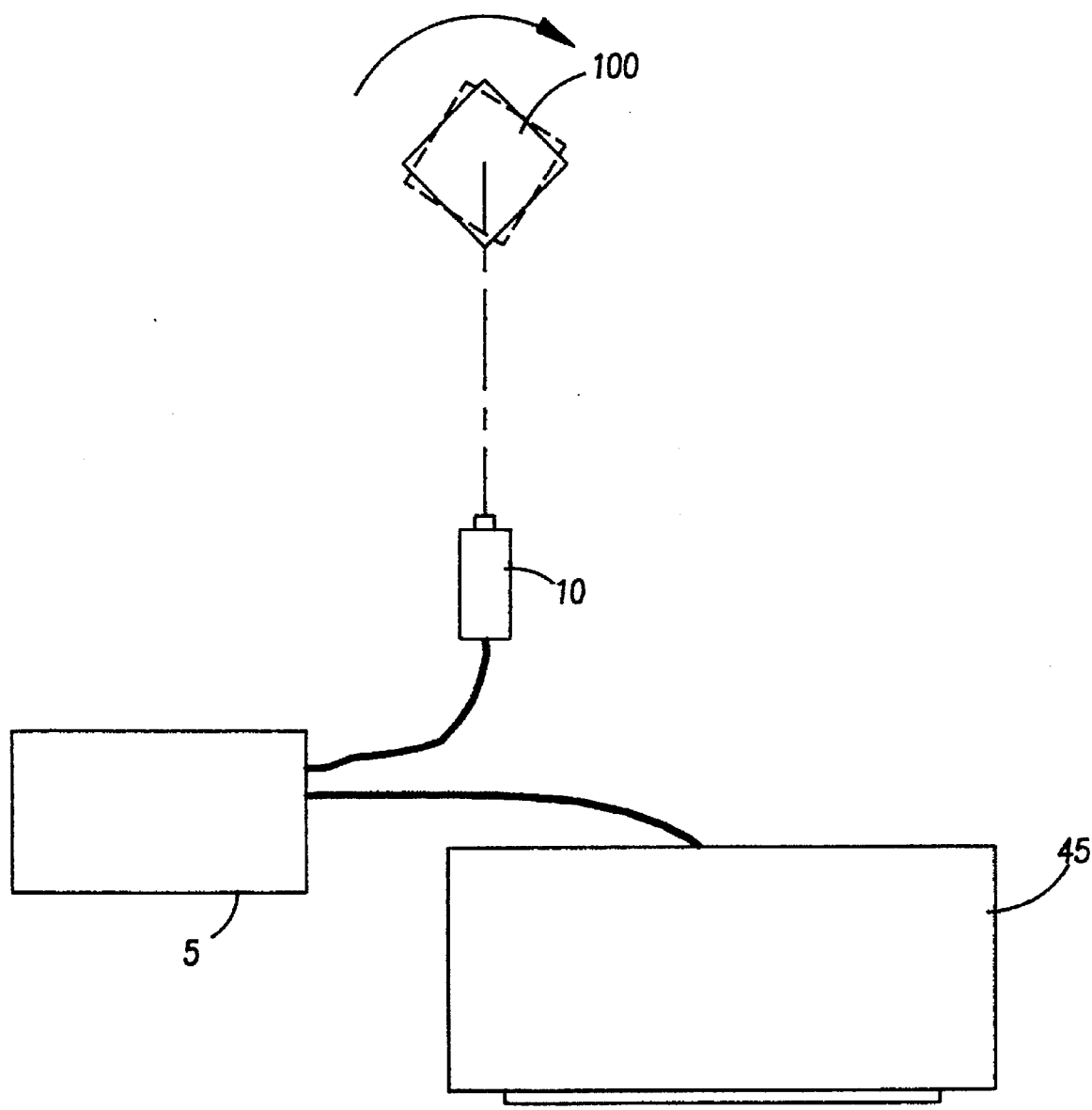
FIG. 13 to FIG. 15 are schematic illustrations showing one or more electronic cameras being used for capturing a series of 2D images of a scene at different viewing angles.

FIG. 13 shows an electronic camera 10, such as a video camera, being used for capturing 2D images of different views of an object 100. As shown, while camera 10 is kept stationary, object 100 is rotated continuously or intermittently to yield a number of 2D views from different angles. In order that the 2D images of different views be maintained in proper registration, or the 2D images displayed on monitor 45 be properly aligned with each other, the camera must be aimed at a reference point, or the key subject, location on the rotation axis of object 100. The 2D views captured or acquired by the electronic camera can be transferred to an image conveying means for conveying to the image displaying means 45.

Figure 14:
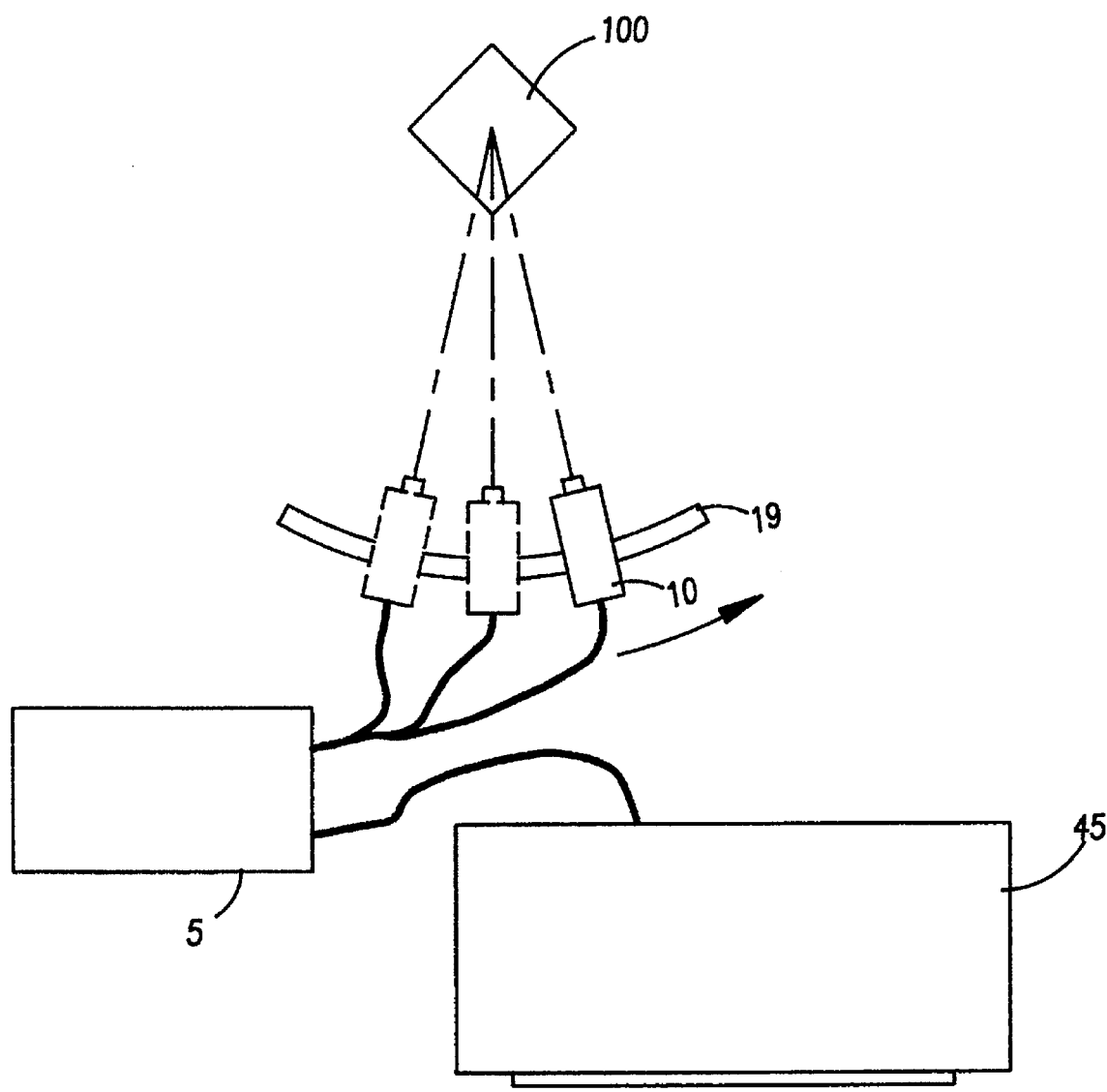

FIG. 14 shows an electronic camera 10 being used for capturing 2D images of different views of an object 100. As shown, while object 100 is kept stationary, camera 10 is moved along a track, preferably a circular track. In order that the 2D images displayed on monitor 45 are proper aligned with each other, the camera must be aimed at a reference point on object 100 while capturing 2D images at different viewing angles.

Figure 15:
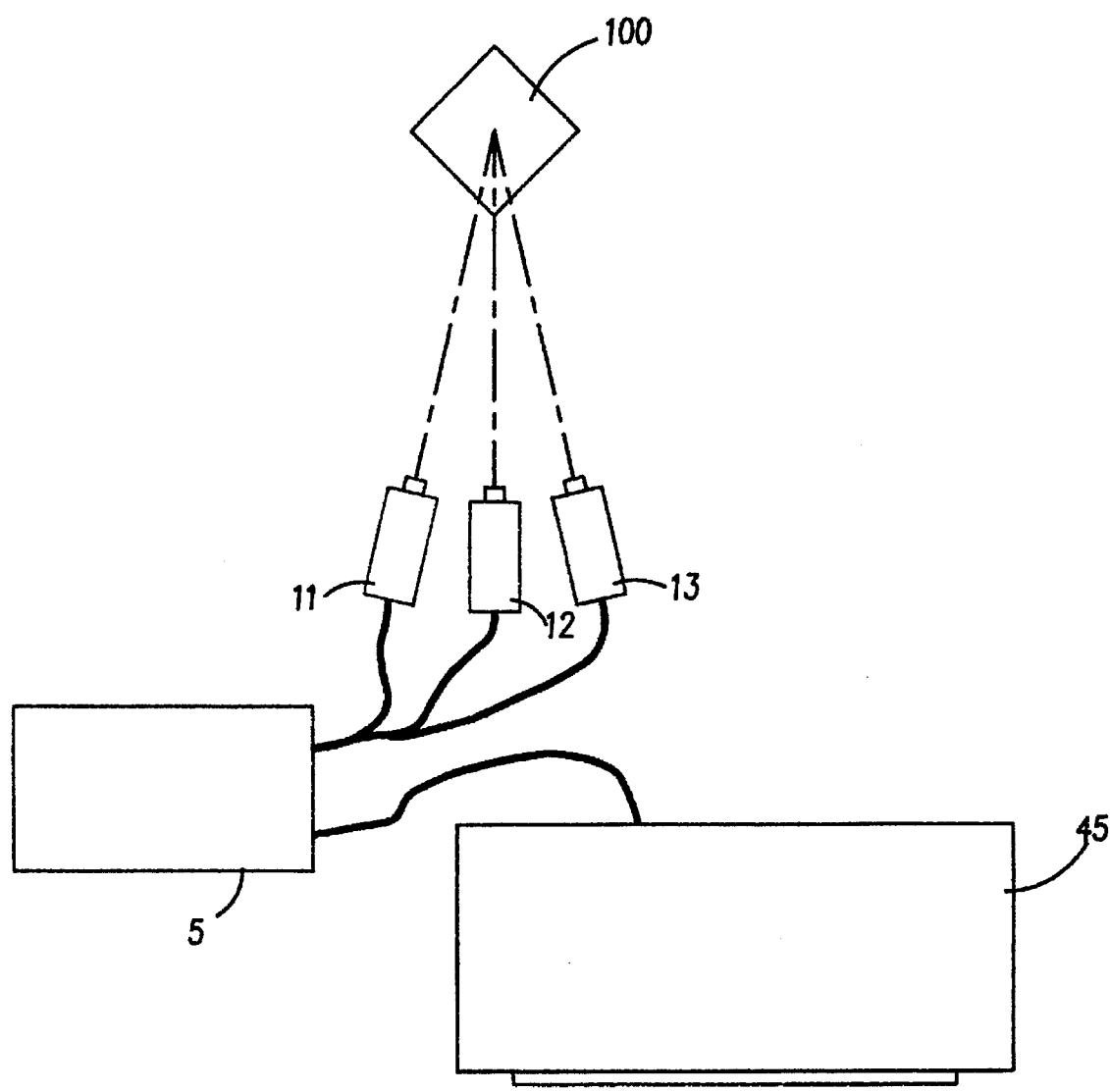

FIG. 15 shows a bank of three electronic cameras 11, 12 and 13 being used to sequentially or simultaneously capture 2D images of three different views of an object. In order that the 2D images displayed on monitor 45 are proper aligned with each other, all the cameras must be aimed at the same reference point on object 100. In FIG. 13 to FIG. 15, the captured 2D images can be displayed and exposed onto a print material in real-time, or stored in an electronic medium by image storing device 5 for later uses. With the arrangement shown in FIG. 13 and FIG. 14, all the 2D images of a scene are properly aligned with each other. Thus, no matter whether a 3D picture is printed in real-times or printed in a later time, key subject alignment is unnecessary during the printing process.

Figure 16:
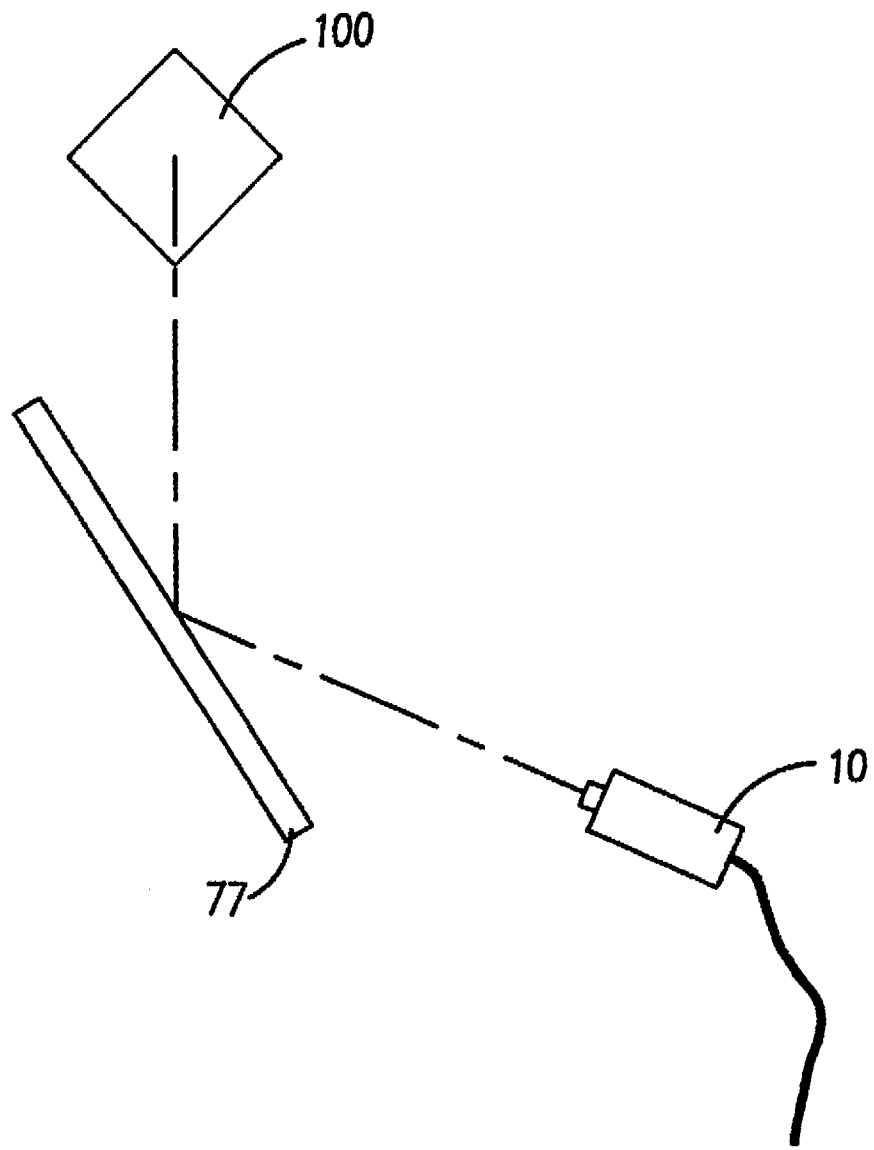
FIG. 16 is a schematic illustration showing an electronic camera being used to capture a series of 2D images of a scene through a plane mirror.

FIG. 16 shows an electronic camera 10, being used to capture a series of 2D images of an object 100 through a plane mirror 77. Even though it is possible to electronically reverse a captured image to become a mirror image, either in the camera or the image storing device 5, it is convenient to optically reverse an image using a plane mirror in front of the camera lens, as shown in FIG. 16. Mirror 77 is preferably a front-coated, or a first surface mirror. Similarly, such a mirror can be used in conjunction with a plurality of electronic cameras for capturing a series of 2D images of a scene. Alternatively, a plane mirror can be placed at a proper location between the monitor screen and the print material to optically reverse an image.

Figure 17:
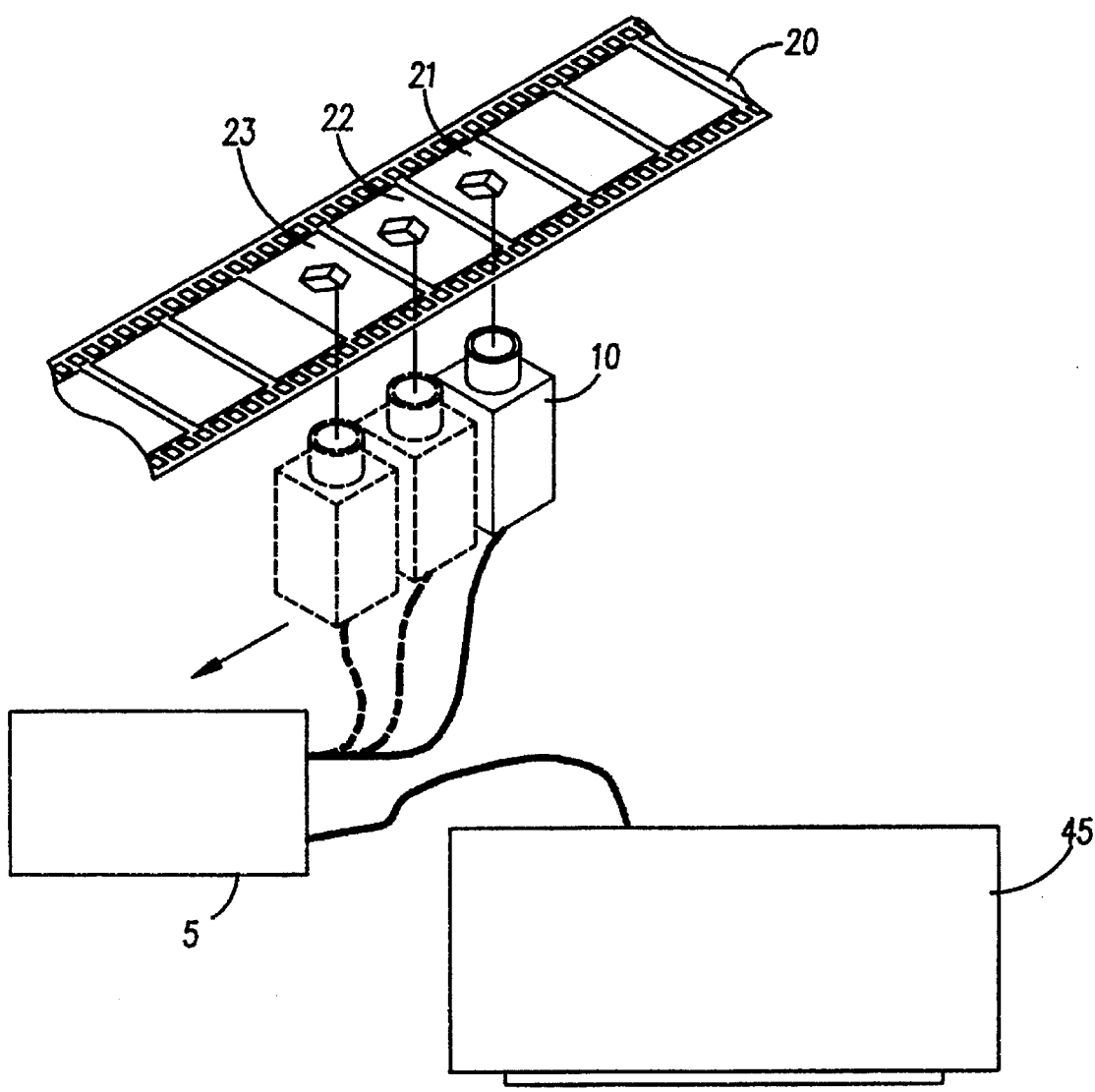
FIG. 17 and FIG. 18 are schematic illustrations, showing one or more electronic camera being used to capture a series of 2D images of a scene recorded on film.

FIG. 17 shows a set of 2D images 21, 22 and 23 of three different views recorded on a film strip 20 being sequentially captured by an electronic camera 10 so that 2D images of these different views can be sequentially displayed, one view at a time, on a video monitor 45 for printing. As with the image acquisition method described with reference to FIG. 14, the positions of the camera in relation to the 2D views on film strip 20 can be pre-calibrated for proper key subject alignment.

Figure 18:
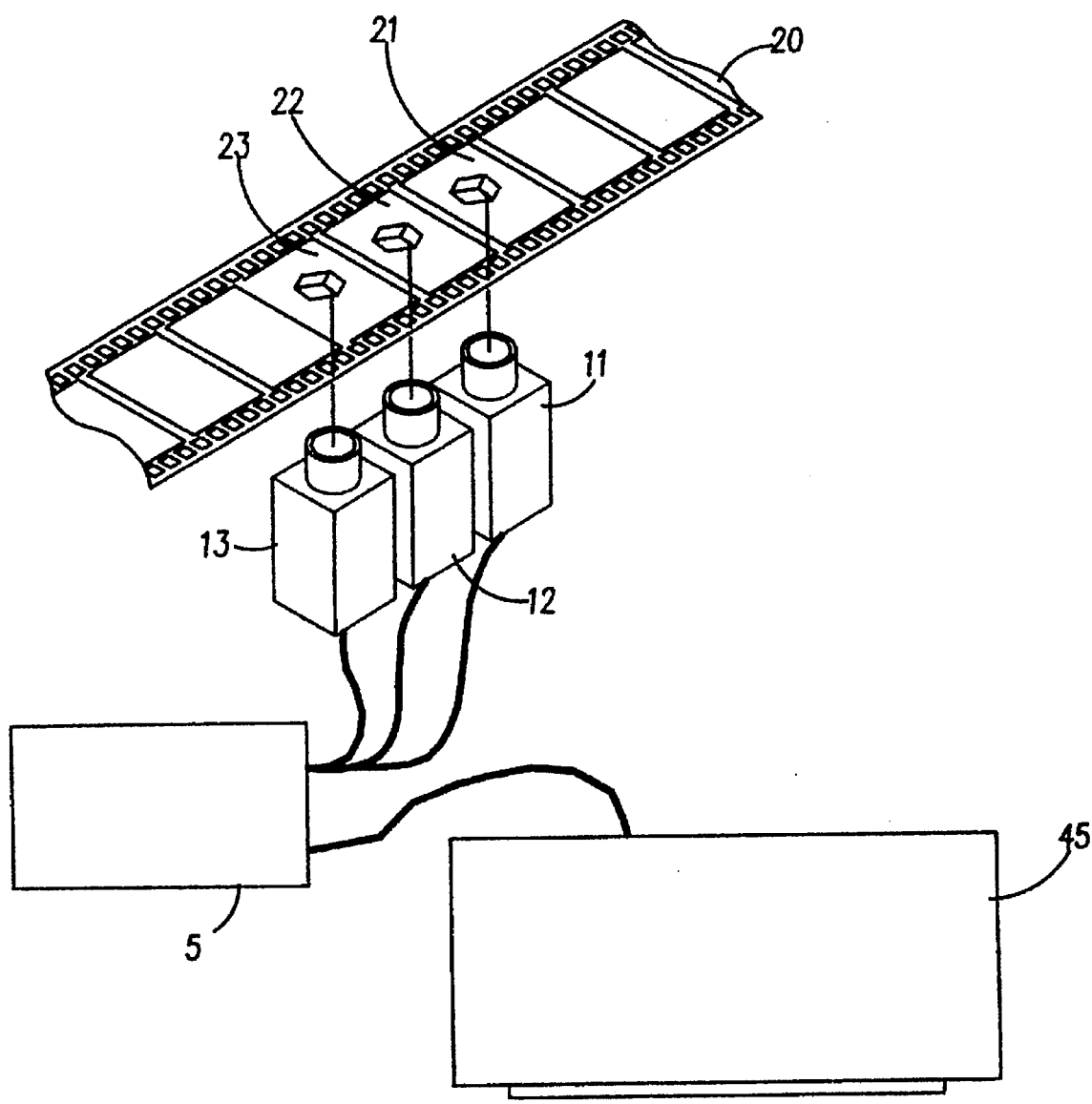

FIG. 18 shows a set of 2D images 21, 22 and 23 of three different views recorded on a film strip 20 being sequentially or simultaneously captured by a bank of three electronic cameras 11, 12 and 13 so that 2D images of these different views can be sequentially displayed, one view at a time, on a video monitor 45 for printing. As with the image acquisition method described with reference to FIG. 15, the positions of the cameras in relation to the 2D views on film strip 20 can be pre-calibrated for proper key subject alignment.

Figure 19A:
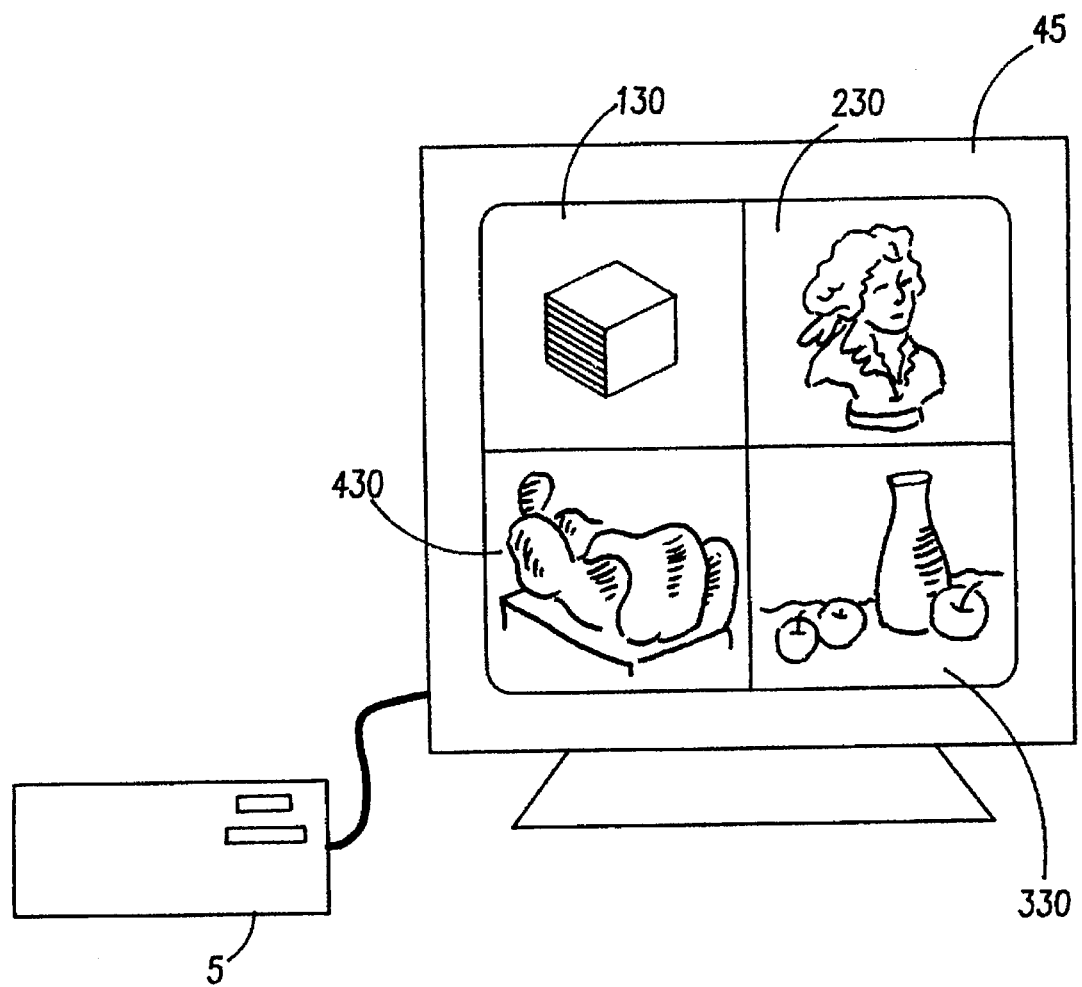
FIG. 19a is a schematic illustration showing a split screen being used to display four 2D images for simultaneously composing four 3D pictures.

FIG. 19a shows four 2D images, 130, 230, 330 and 430, being displayed on the same monitor screen so that four 3D pictures can be composed simultaneously. As with the single 2D image displayed on monitor screen 30 shown in FIG. 1, each of the four 2D images 130, 230, 330 and 430 represents one of N different views of a scene. These four 2D images can be the same or different. It is understood that the number of 2D images simultaneously displayed on such a split screen can be any number, ranging from 2 to 100 or more for a practical application.

Figure 19B:
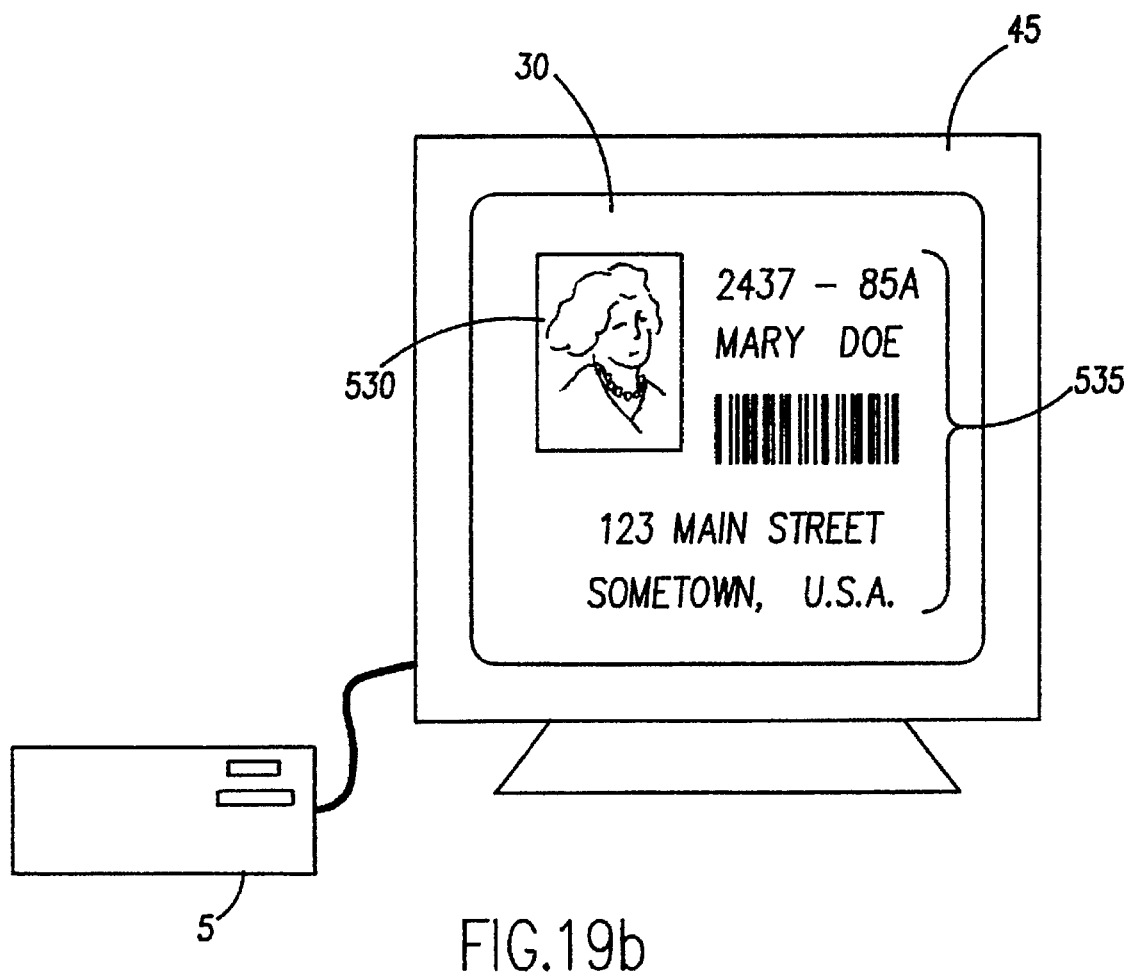
FIG. 19b is a schematic illustration showing a printing arrangement wherein a portion of the video monitor screen is used to display 2D images of different views while the rest of screen is used to display texts and graphics.

FIG. 19b is a schematic illustration showing a portion of the screen 30 of video monitor 45 is used to display 2D images of different views of a scene while the rest of the screen 30 is used to display text and/or graphics. As shown, image 530 represents one of a set of 2D images of different views of a scene to be exposed on lenticular print material to make a 3D picture. The text and graphics, as collectively denoted by numeral 535, displayed on the other part of screen 30. The text and graphics exposed at one projection angle may be the same as or different from the text and graphics exposed at other projection angles. If the text and graphics are the same at all projection angles, the print material need not be lenticular in the entire area, as shown in FIG. 19c.

Figure 19C:
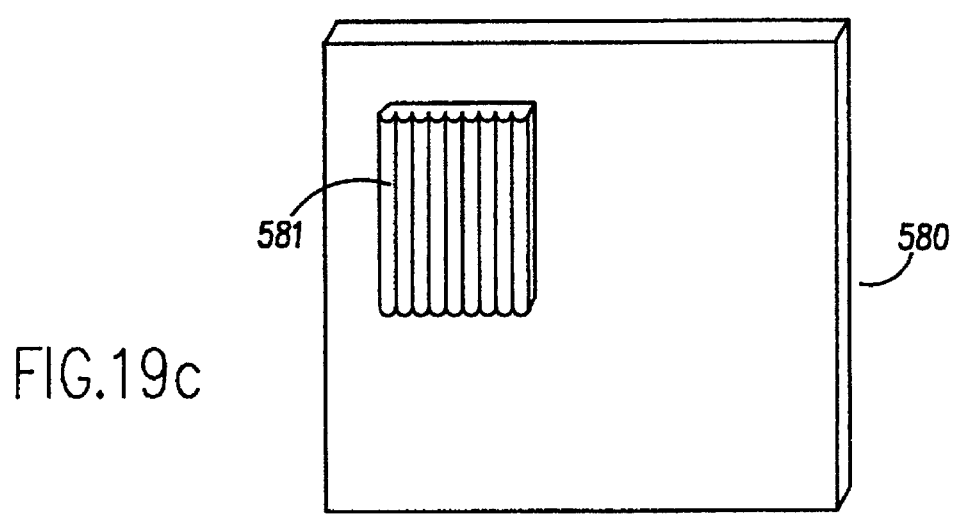
FIG. 19c is an isometric views of a print material, showing only a portion of which has a lenticular screen for 3D printing.

FIG. 19c shows a print material only a portion of which has a lenticular surface. As shown, while area 581 of the print material 580 has a lenticular surface for printing a 3D image, the rest of the area does not have a lenticular surface.

Figure 20:
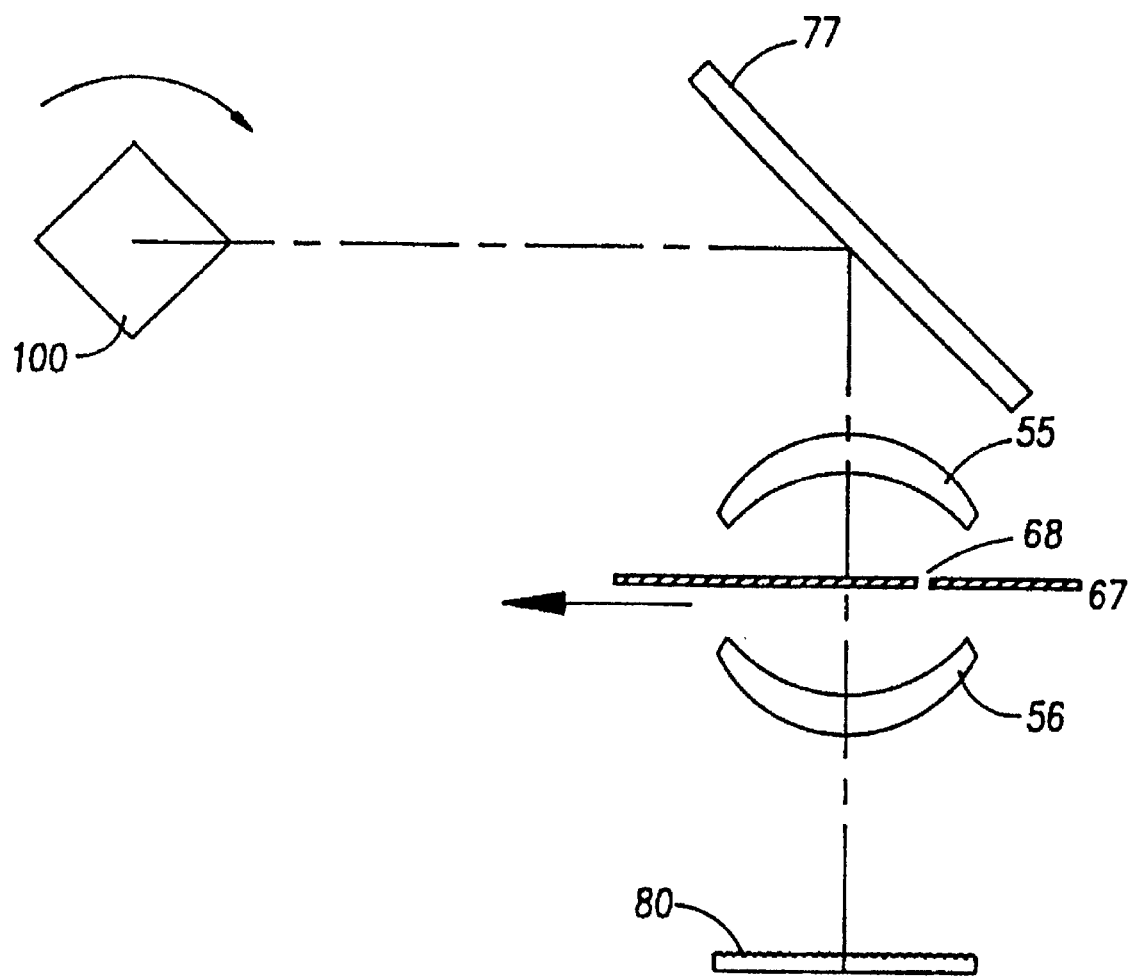
FIG. 20 is a schematic illustration showing a single narrow slit being shifted continuously across the lens aperture to change the projection angles while the photographed scene is rotated in synchronization so that the image of scene formed by the projection lens through a plane mirror directly exposes on the print material.

FIG. 20 is a schematic representation of a printing arrangement where the printer is used for making a 3D picture directly from an object 100 on lenticular print material 80. In such arrangement, neither the image displaying means nor the electronic camera is necessary. As shown in FIG. 20, object 100 is rotated continuously or intermittently, in synchronization with the scanning motion of the single slit 68. A large aperture projection lens 55, 56 is used for forming the 2D images of different views of object 100. A plane mirror 77 is used to optically reverse the 2D images before they are exposed on print material 80. As shown in FIG. 20, mirror 77 is placed between the object and the projection lens at an proper angle. It is understood that mirror 77 can also be placed at a proper location between the object and the print material. Furthermore, the multiple-window aperture plate 60 of FIG. 2 and the single-window aperture plate 65 of FIG. 3 may also be used in this printing arrangement. It is preferred that lenticular print material is precoated with photosensitive emulsion.

Figure 21A:
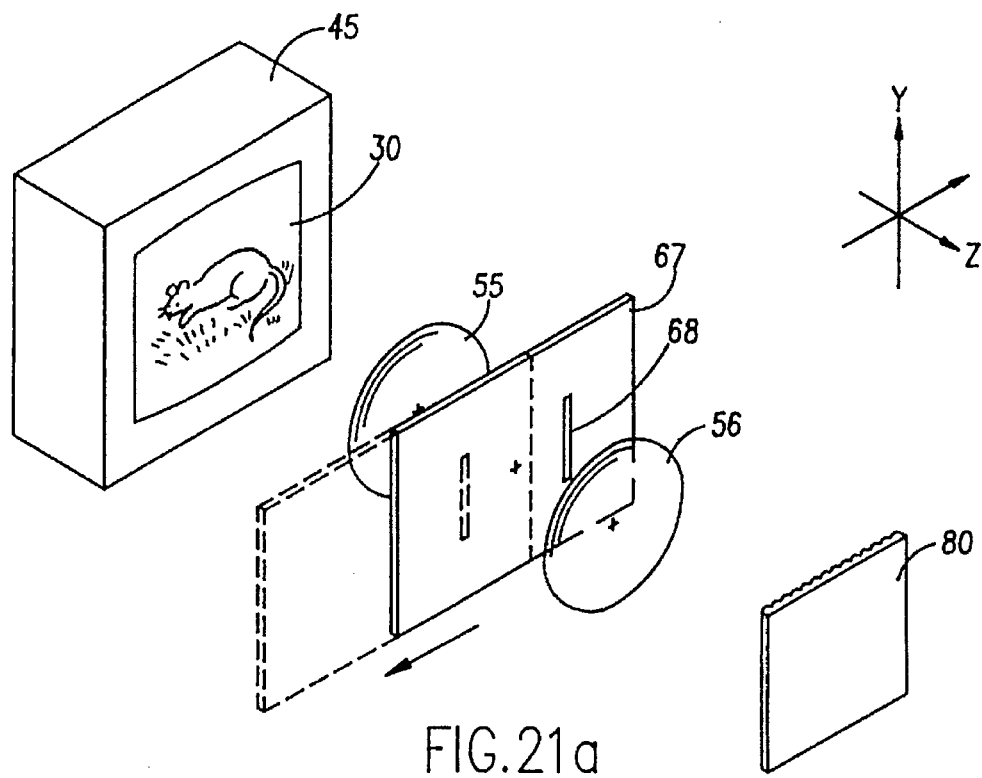
FIG. 21a is a schematic illustration showing a printing arrangement wherein the longitudinal axes of the lenticules are parallel to the vertical axis of the displayed 2D image in a normal sense.

FIG. 21a is a schematic illustration showing a printing arrangement wherein the longitudinal axes of the lenticules are parallel to the vertical axis of the displayed scene in a normal sense. As shown in FIG. 21a, the longitudinal axes of the lenticules are parallel to the Y axis. The vertical axis of the displayed scene 30 is also parallel to the Y axis. The shifting direction of the aperture slit or window is perpendicular to the longitudinal axes of the lenticules on print material 80.

Figure 21B:
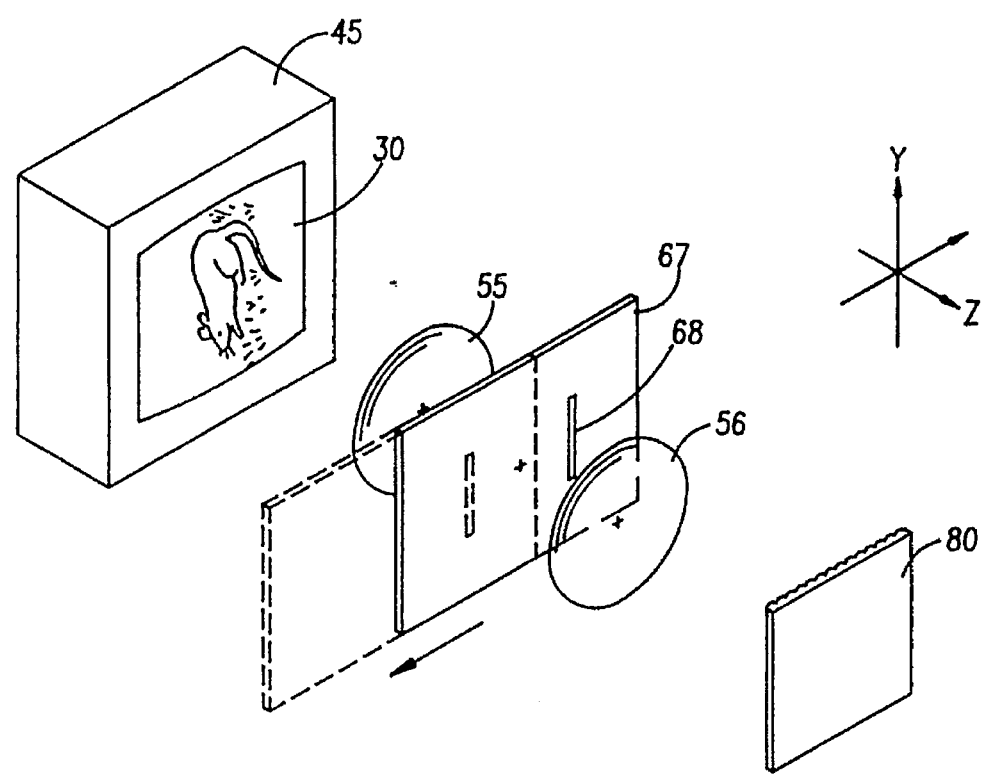
FIG. 21b is a schematic illustration showing a printing arrangement wherein the longitudinal axes of the lenticules are perpendicular to the vertical axis of the displayed 2D image in a normal sense.

FIG. 21b is a schematic illustration showing a printing arrangement wherein the longitudinal axes of the lenticules are perpendicular to the vertical axis of the displayed scene in a normal scene. As shown in FIG. 21b, the longitudinal axes of the lenticules are parallel to the Y axis. However, the vertical axis of the displayed scene 30 is perpendicular to the Y axis. It is understood that, the shifting direction of the aperture slit or window is perpendicular to the longitudinal axes of the lenticules. It is understood that the multiple-window aperture plate 60 of FIG. 2 and the single-window aperture plate 65 of FIG. 3 may be used in both the arrangements shown in FIG. 21a and FIG. 21b.

Figure 22:
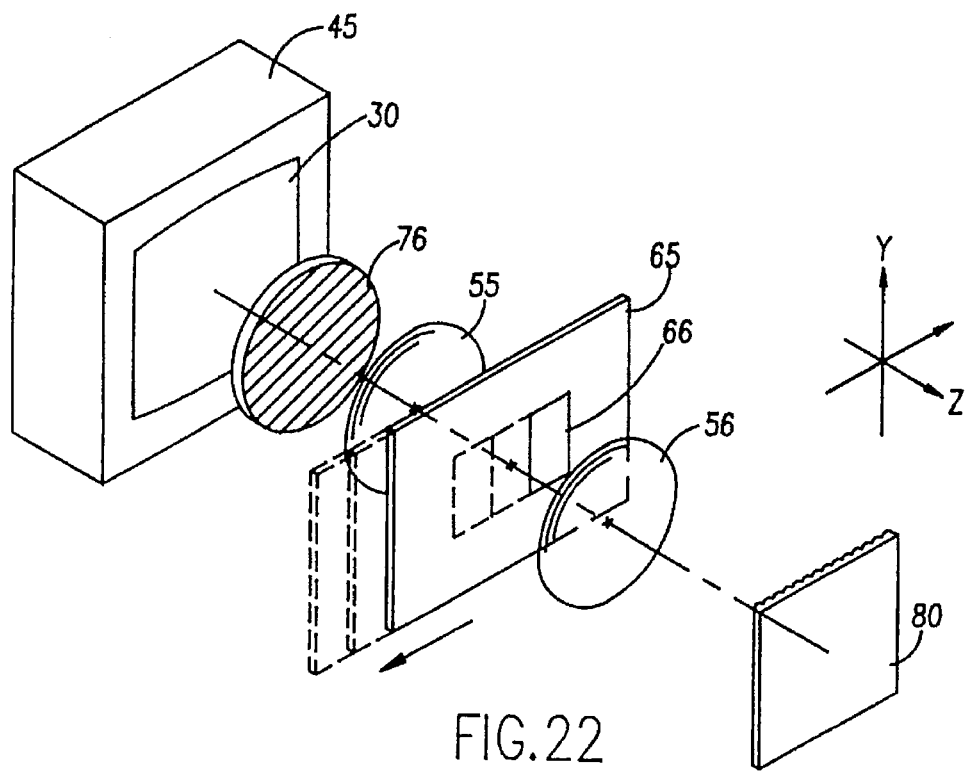
FIG. 22 is a schematic illustration showing a printing arrangement wherein a video monitor is used for displaying 2D images in color or in monochrome for printing, and a plurality of color filters are used to achieve a desired color of the 3D picture.

FIG. 22 is a schematic illustration showing a printing arrangement wherein video monitor 45 is a color monitor being used to display 2D images in color or in monochrome for printing, and one or more color filters 76 are used to achieve the desired color of the 3D picture. It is understood that video monitor 45 can be a black-and-white monitor for making a monochrome 3D picture.

Figure 23:
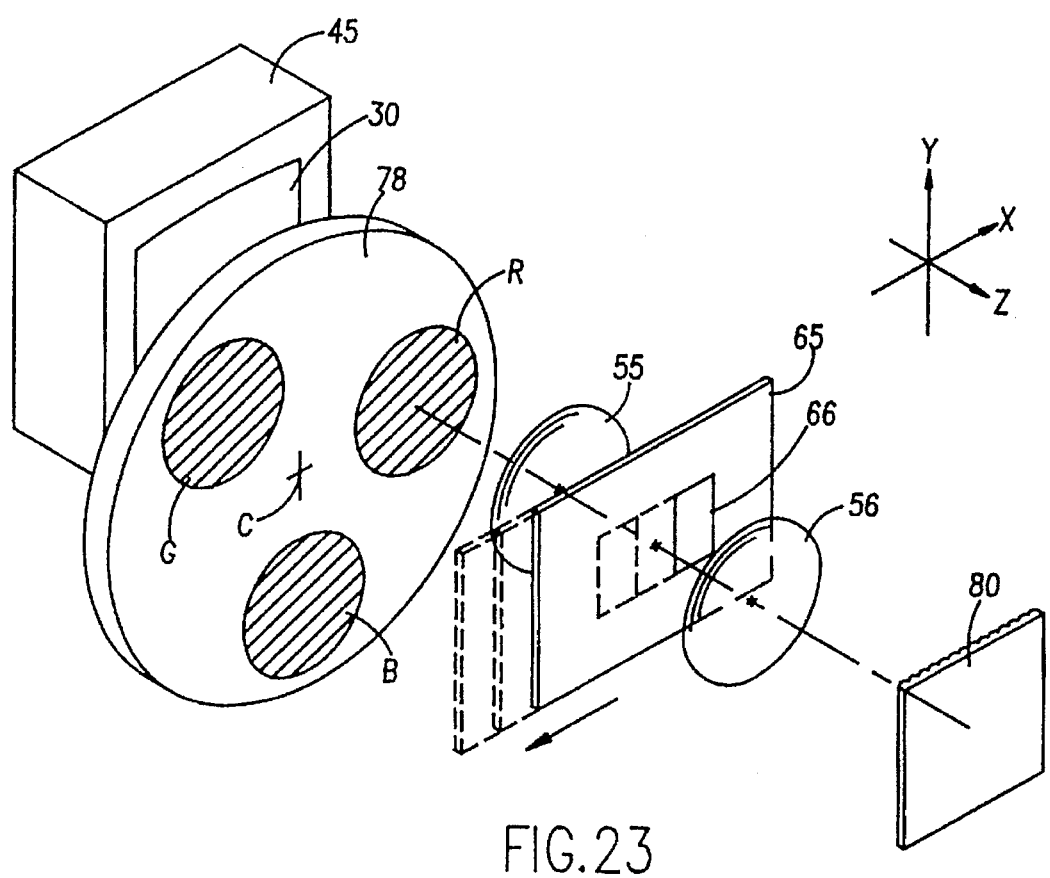
FIG. 23 is a schematic illustration showing a printing arrangement wherein a video monitor is used for displaying component color images of each view for printing, and a filter assembly is use to achieve a desired color of the 3D picture.

FIG. 23 is a schematic illustration showing a printing arrangement for making a color 3D picture wherein the 2D image of each view is separated into three component color images such as red, green and blue, or RGB. For exposing each 2D image onto the print material at a projection angle, a video monitor 45 sequentially displays the three component color images of the same 2D image, each for the proper duration. Video monitor 45 can be a color monitor or a black-and-white monitor. As with the arrangement shown in FIG. 22, color filters may be used to achieved the desired color of the 3D picture. In addition, a filter assembly 78 containing three color filters in red, green and blue, or RGB, may be used to filter the corresponding component color images displayed on the monitor during exposure.

METHOD OF OPERATION

The method of operation presented herein is described in accordance with a 3D printer which uses:

1. A set of 2D images of three different views of a scene for composing a 3D picture;

2. A monitor screen for displaying the 2D images, one view at a time, for printing;

3. A large-aperture projection lens having an aperture sufficiently large to cover the entire width of each lenticule on the print material;

4. A single-window aperture plate on which the window width is substantially equal to $\frac{1}{3}$ of the full aperture so that the compressed line-form image formed on the photosensitive emulsion underlying each lenticule is roughly ⅓ the width of the lenticule.

The arrangement of the printer components is similar to the schematic representation in FIG. 1 and FIG. 3. Before the printing process starts, the shutter is closed and the aperture plate is located in the first printing position which can be the right-most printing position as depicted in FIG. 3.

After the 2D image of the first view is displayed on the monitor screen, the shutter is opened for exposing the displayed 2D image, through the projection lens and the aperture window, onto the print material. After an appropriate duration, the shutter is closed.

It follows that the 2D image of the second view is displayed on the monitor screen and the aperture plate is moved to the second printing position which is the center position. The shutter is opened for exposing the displayed 2D image, through the projection lens and the aperture window, onto the print material. After an appropriate duration, the shutter is closed.

The 2D image of the third view is then displayed on the monitor screen and the aperture plate is moved to the third printing position which is the left-most position as depicted in FIG. 3. The shutter is again opened tier exposing the displayed 2D image, through the projection lens and the aperture window, onto the print material. After an appropriate duration, the shutter is closed.

At this point, the print material has been exposed with 2D images of three different views at three projection angles. The photosensitive emulsion underlying each lenticule is properly filled with compressed line-formed images. The exposed print material may be brought to a chemical processor to complete the photographic processing step.

The above description sets forth the best mode of the invention as known to the inventor at this time, and the above examples are for illustrative purposes only, as it is obvious that one skilled in the art may make modifications to this process without departing the spirit and scope of the invention and its equivalent as set forth in the appended claims.

What is claimed is:

1. A 3D photographic printer for printing an image array on the photosensitive surface of lenticular print material from a plurality of 2D images of different 2D views, said image array consisting of compressed line-form images within each of the lenticules on said print material and said print material being stationary during printing, said printer comprising:

a. an image displaying means for displaying 2D images of different 2D views one at a time prior to exposing the 2D images of each of said 2D views displayed thereon at a stationary exposing position for printing;

b. a stationary projection lens for exposing said displayed 2D images of 2D views onto said print material, said projection lens having a large aperture sufficient for filling the entire area of each of said lenticules with said line-form images, with said lens aperture being partitioned into a plurality of horizontally-spaced sections;

c. means to control said aperture of said projection lens for transmitting light rays from displayed 2D images of each view through a different aperture section of said projection lens during printing.

2. The 3D photographic printer of claim 1, wherein said means to control said aperture comprises an opaque plate partitioned into a plurality of horizontally-spaced windows in registry with said aperture sections of said projection lens, said windows being capable of being opened one at a time as controlled by said means to control said aperture.

3. The 3D photographic printer of claim 1 further comprising at least one electronic camera for acquiring each of said 2D views of a single scene at a plurality of viewing angles with the 2D images of 2D views acquired therewith being conveyed to said image displaying means, and means for aiming and maintaining said electronic camera at a common point of said scene while capturing said images at different viewing angles in order to maintain said 2D images of different views in proper registration during printing.

4. The 3D photographic printer of claim 3, wherein said electronic camera further comprises image storage means for storing said acquired 2D images of 2D views, and conveying means for conveying said 2D images of 2D views to said image displaying means.

5. The 3D photographic printer of claim 4, wherein said image storage means comprises a storing medium selected from the group consisting of a computer hard-disk, a floppy disk, a CD-ROM, a magnetic tape, a magnetic card and a photo-CD.

6. The 3D photographic printer of claim 3 wherein said electronic camera comprises a plurality of electronic cameras.

7. The 3D photographic printer of claim 3, wherein said electronic camera directly acquires said 2D views of a single scene.

8. The 3D photographic printer of claim 3, wherein said electronic camera acquires said 2D views of a single scene through a mirror.

9. The 3D photographic printer of claim 3, wherein said electronic camera acquires said 2D views of a single scene which have been recorded on photographic film prior to being captured by said camera.

10. The 3D photographic printer of claim 1, wherein said image displaying means comprises a video monitor.

11. The 3D photographic printer of claim 1, wherein said image displaying means comprises an image projection system.

12. The 3D photographic printer of claim 1, wherein said means to control said aperture comprises an electro-optic mechanism partitioned into a plurality of horizontally-spaced zones in registry with said aperture sections of said projection lens and an electronic controlling mechanism for controlling transmission of light through different zones of said electro-optic mechanism one at a time, said electro-optic mechanism comprising a liquid crystal light valve.

13. The 3D photographic printer of claim 1, wherein said means to control said aperture comprise an opaque plate with a single opening which can be brought into registry with one of said aperture sections of said projection lens and moving means for moving said opaque plate to different positions across said aperture of said projection lens.

14. The 3D photographic printer of claim 1, wherein each of said displayed 2D images comprises of number of images frames each being one of a plurality of 2D images of a scene.

15. A method of printing an image array on the photosensitive surface of a stationary lenticular print material from a plurality of 2D images of different 2D views through a stationary projection lens, said image array consisting of compressed line-form images with each of the lenticules on said print material, comprising:

a. using an image displaying means for displaying 2D images of different 2D views, one view at a time, prior to exposing each of the 2D images displayed thereon at a stationary exposing position;

b. exposing each of the 2D images through said stationary projection lens having a large aperture sufficient for filling the entire area of each of said lenticules and said lens aperture being partitioned into a plurality of horizontally-spaced sections; and controlling said aperture by selecting said aperture sections of said projection lens for transmitting light rays from said displayed 2D images of each different view one at a time through a different aperture section of said projection lens during printing.

16. A printing method of claim 15 further comprising the step of capturing 2D images of different 2D views of a scene by an electronic camera, with said scene being rotated in relation to said camera with said camera being aimed at said scene in order that all captured 2D images of different views are in proper registration.

17. The 3D pictures produced by the method of claim 16, which are printed on the photosensitive surface of lenticular print material which has a plurality of lenticules and there are at least twenty compressed line-form images of different views within each lenticule, with each image being a slightly different from view from any adjacent image.

18. The 3D pictures produced by the method of claim 15, which are printed on the photosensitive surface of lenticular print material which has a plurality of lenticules and there are at least twenty compressed line-form images of different views within each lenticule, with each image being a slightly different from view from any adjacent image.

19. The printing method of claim 15 further comprising the step of capturing 2D images of different 2D views of the scene by an electronic camera, with said camera being moved in relation to said scene with said camera being aimed at said scene in order that all captured 2D images of different views are in proper registration.

20. A 3D photographic printer for printing an image array on the photosensitive surface of a stationary lenticular print material from 2D images of different 2D views of a single scene with said scene being arranged so that it can be rotated about one of its axes in relation to said printer, said image array consisting of compressed line-form images within each of the lenticules on said print material, said scene being rotated about one of its axes during printing; said printer comprising:

a stationary projection lens for forming and exposing said 2D images on said print material, said projection lens having a large aperture sufficient for filling substantially the entire area of the photosensitive surface underlying each lenticule with said line-form images, with said lens aperture being partitioned into a plurality of horizontally-spaced sections;

means for controlling said aperture of said projection lens to allow the 2D image of each view to be exposed through a different section of said projection lens during printing.

21. The 3D printer of claim 20 further comprising a plane mirror disposed at a proper angle between said rotating scene and said print material to reverse the images exposed on said print material.

22. A method of producing a 3D picture by exposing an image array on the photosensitive surface of a stationary lenticular print material from 2D images of different 2D views of a scene through a stationary projection lens, said image array consisting of compressed line-form images within each of the lenticules on said print material, said projection lens having a large aperture sufficient to fill the entire area of the photosensitive surface underlying each lenticule with said line-form images, with said lens aperture being partitioned into a plurality of horizontally-spaced sections, said method comprising the steps of:

(a) rotating said scene about one of its axes during printing;

(b) controlling said lens aperture so that only one aperture section is opened at a time corresponding to each of said views so that each view is exposed through a different opened aperture section.

(c) forming 2D images of different views of said rotating scene by said projection lens and exposing said 2D images on said print material.

23. The method of claim 22 further comprising the step of reversing said 2D images into mirror images prior to exposing said 2D images on said print material.

24. The 3D pictures produced by the method of claim 22, which are printed on the photosensitive surface of lenticular print material which has a plurality of lenticules and there are at least twenty compressed line-form images of different views within each lenticule, with each image being a slightly different from view from any adjacent image.

* * * * *